United States Patent
Kamiya et al.

(10) Patent No.: US 10,965,879 B2
(45) Date of Patent: Mar. 30, 2021

(54) IMAGING DEVICE, VIDEO SIGNAL PROCESSING DEVICE, AND VIDEO SIGNAL PROCESSING METHOD

(71) Applicant: SONY CORPORATION, Tokyo (JP)

(72) Inventors: Koji Kamiya, Kanagawa (JP); Masato Izawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/482,851

(22) PCT Filed: Mar. 15, 2018

(86) PCT No.: PCT/JP2018/010238
§ 371 (c)(1),
(2) Date: Aug. 1, 2019

(87) PCT Pub. No.: WO2018/169003
PCT Pub. Date: Sep. 20, 2018

(65) Prior Publication Data
US 2020/0007735 A1    Jan. 2, 2020

(30) Foreign Application Priority Data

Mar. 15, 2017 (JP) .............................. JP2017-050652

(51) Int. Cl.
*H04N 5/235* (2006.01)
*G06T 5/00* (2006.01)
(Continued)

(52) U.S. Cl.
CPC ............. *H04N 5/2355* (2013.01); *G06T 5/00* (2013.01); *H04N 5/20* (2013.01); *H04N 5/243* (2013.01); *H04N 5/355* (2013.01)

(58) Field of Classification Search
CPC ........ H04N 5/2355; H04N 5/20; H04N 5/243; H04N 5/355; H04N 5/232; H04N 5/235; G06T 5/00
See application file for complete search history.

(56) References Cited

U.S. PATENT DOCUMENTS

| 5,638,138 A | 6/1997 | Hickman |
| 8,014,445 B2 * | 9/2011 | Segall ..................... H04N 19/85 375/240.01 |

(Continued)

FOREIGN PATENT DOCUMENTS

| JP | 10-216116 A | 8/1998 |
| JP | 10-285448 A | 10/1998 |

(Continued)

OTHER PUBLICATIONS

International Search Report dated Jun. 5, 2018 in PCT/JP2018/010238 citing documents AO-AT therein, 2 pages.

(Continued)

*Primary Examiner* — Ahmed A Berhan
(74) *Attorney, Agent, or Firm* — Oblon, McClelland, Maier & Neustadt, L.L.P.

(57) ABSTRACT

An imaging device includes: an imaging unit having an imaging element; a first video signal processing unit that generates a first video signal of a first dynamic range from a pixel signal obtained by the imaging unit; and a second video signal processing unit that generates an information signal of a high-pass luminance change component of at least a high luminance portion from the first video signal, reduces a luminance value of a high luminance portion of the first video signal to generate a luminance reduction video signal of a second dynamic range narrower than the first dynamic range, and adds the generated luminance reduction (Continued)

video signal to the information signal of the luminance change component to generate a second video signal.

19 Claims, 28 Drawing Sheets

(51) Int. Cl.
*H04N 5/243* (2006.01)
*H04N 5/355* (2011.01)
*H04N 5/20* (2006.01)

(56) References Cited

U.S. PATENT DOCUMENTS

| | | |
|---|---|---|
| 2006/0028560 A1 | 2/2006 | Konda et al. |
| 2009/0066816 A1 | 3/2009 | Wakagi et al. |
| 2015/0023594 A1* | 1/2015 | Zhang .................. H04N 3/155 |
| | | 382/167 |
| 2015/0103919 A1* | 4/2015 | Hattori .................. H04N 19/30 |
| | | 375/240.25 |
| 2015/0222792 A1 | 8/2015 | Ogikubo |
| 2019/0045137 A1 | 2/2019 | Kamiya |

FOREIGN PATENT DOCUMENTS

| | | | |
|---|---|---|---|
| JP | 2003230022 A | * | 8/2003 |
| JP | WO2007/108317 A1 | | 9/2007 |
| JP | 2013-138351 A | | 7/2013 |
| JP | 2014-13322 A | | 1/2014 |
| JP | 2016-195378 A | | 11/2016 |
| JP | 2016-197854 A | | 11/2016 |

OTHER PUBLICATIONS

Extended European Search Report dated Feb. 26, 2020 in corresponding European Patent Application No. 18767408.0 citing documents AC, AD and AU therein, 9 pages.

\* cited by examiner

IMAGING DEVICE, VIDEO SIGNAL PROCESSING DEVICE, AND VIDEO SIGNAL PROCESSING METHOD

TECHNICAL FIELD

The present technology relates to an imaging device such as a video camera, a video signal processing device used in an imaging device or the like, and a video signal processing method.

BACKGROUND ART

In HDR (High Dynamic Range) imaging, it is possible to express video having a wide dynamic range and express dark parts, colors having high luminance, or the like that cannot be expressed by a SDR (Standard Dynamic Range) video signal having a standard dynamic range that is displayable by general monitors.

Known technologies relevant to HDR and LDR video signal processing include a technology for simultaneously generating HDR video and LDR video (see Patent Literature 1), a technology for converting LDR video into HDR video (see Patent Literature 2), or the like. Note that a LDR is synonymous with a SDR.

CITATION LIST

Patent Literature

Patent Literature 1: Japanese Patent Application Laid-open No. 2016-195379
Patent Literature 2: WO 2011/04222

DISCLOSURE OF INVENTION

Technical Problem

However, when a SDR video signal is generated by knee correction or the like from a video signal captured by a camera capable of capturing an image with HDR, the contrast of a high luminance portion is remarkably reduced. Thus, various problems such as a reduction in the visibility of display video are caused, and methods for satisfactorily solving the problems have not been established.

It is an object of the present technology to provide an imaging device, a video signal processing device, and a video signal processing method capable of generating a SDR video signal ensuring the contrast of a high luminance portion from a video signal captured with HDR.

Solution to Problem

In order to solve the above problem, an imaging device that corresponds to a first embodiment according to the present technology includes: a first video signal processing unit that generates a first video signal of a first dynamic range from a pixel signal obtained by an imaging unit; and a second video signal processing unit that generates an information signal of a luminance change component in a prescribed luminance region from the first video signal, generates a luminance reduction video signal of a second dynamic range narrower than the first dynamic range from the first video signal, and generates a second video signal on the basis of the luminance reduction video signal and the information signal of the luminance change component.

The luminance region may be a region of a high luminance portion exceeding a prescribed threshold.

The imaging device may further include a first output unit that outputs the second video signal to a display unit.

The imaging device may further include a second output unit that outputs the first video signal to an outside device.

The imaging device may further include a view finder that outputs the second video signal.

The second video signal processing unit may be configured to perform knee correction on the first video signal to generate the luminance reduction video signal.

The second video signal processing unit may be configured to extract the high-pass luminance change component from the first video signal using a high-pass filter.

The second video signal processing unit may be configured to multiply the extracted high-pass luminance change component by a prescribed gain to generate the information signal of the luminance change component.

The first video signal may be a color video signal, and the second video signal processing unit may be configured to generate a plurality of the luminance signals from the color video signal according to a plurality of calculation formulas and select the luminance signal having the largest absolute value to generate the high-pass luminance change component.

The second video signal processing unit may be configured to multiply a value of the high-pass luminance change component by a different gain depending on whether the value of the high-pass luminance change component is positive or negative, and configured to make a second gain used when the value of the high-pass luminance change component is positive smaller than a first gain used when the value of the high-pass luminance change component is negative.

The imaging device may further include an operation input unit having at least one or more operation elements that receive an operation from a user, and the control unit may be configured to detect states of the at least one or more operation elements during shooting and reflect setting information based on the operation on an action of the second video signal processing unit in real time.

The setting information may be information on the gain or information on the calculation formulas.

The imaging device may further include a user interface that allows allocation of a type of the setting information to be set with respect to the at least one or more operation elements.

The first video signal processing unit may be a correction circuit that performs preprocessing including correction of the pixel signal obtained by the imaging unit to output the first video signal.

The second video signal processing unit may generate the information signal of the luminance change component in the prescribed luminance region from a luminance signal of the first video signal, generate the luminance reduction video signal of the second dynamic range narrower than the first dynamic range from the first video signal, and generate the second video signal on the basis of the luminance reduction video signal and the information signal of the luminance change component.

The second video signal processing unit may generate the information signal of the luminance change component in the prescribed luminance region for each color component of the first video signal and generate the second video signal on the basis of the information signal for each color component and the luminance reduction video signal for each color component of the second dynamic range.

The second video signal processing unit may be configured to be switchable between a mode in which the second video signal processing unit generates the information signal of the luminance change component in the prescribed luminance region from a luminance signal of the first video signal, generates the luminance reduction video signal of the second dynamic range narrower than the first dynamic range from the first video signal, and generates the second video signal on the basis of the luminance reduction video signal and the information signal of the luminance change component and a mode in which the second video signal processing unit generates the information signal of the luminance change component in the prescribed luminance region for each color component of the first video signal and generates the second video signal on the basis of the information signal for each color component and the luminance reduction video signal for each color component of the second dynamic range.

A video signal processing device that corresponds to another embodiment according to the present technology includes: a first video signal processing unit that generates a first video signal of a first dynamic range from a pixel signal obtained by an imaging unit; and a second video signal processing unit that generates an information signal of a luminance change component in a prescribed luminance region from the first video signal, generates a luminance reduction video signal of a second dynamic range narrower than the first dynamic range from the first video signal, and generates a second video signal on the basis of the luminance reduction video signal and the information signal of the luminance change component.

A video signal processing method that corresponds to another embodiment according to the present technology includes:

generating a first video signal of a first dynamic range from a pixel signal obtained by an imaging unit by a first video signal processing unit; and generating an information signal of a luminance change component in a prescribed luminance region from the first video signal, generating a luminance reduction video signal of a second dynamic range narrower than the first dynamic range from the first video signal, and generating a second video signal on the basis of the luminance reduction video signal and the information signal of the luminance change component by a second video signal processing unit.

Advantageous Effects of Invention

As described above, a SDR video signal ensuring the contrast of a high luminance portion can be generated from a video signal captured with a HDR according to the present technology.

MODE(S) FOR CARRYING OUT THE INVENTION

Hereinafter, embodiments according to the present technology will be described with reference to the drawings.

First Embodiment

[Entire Configuration]

Figure 1:
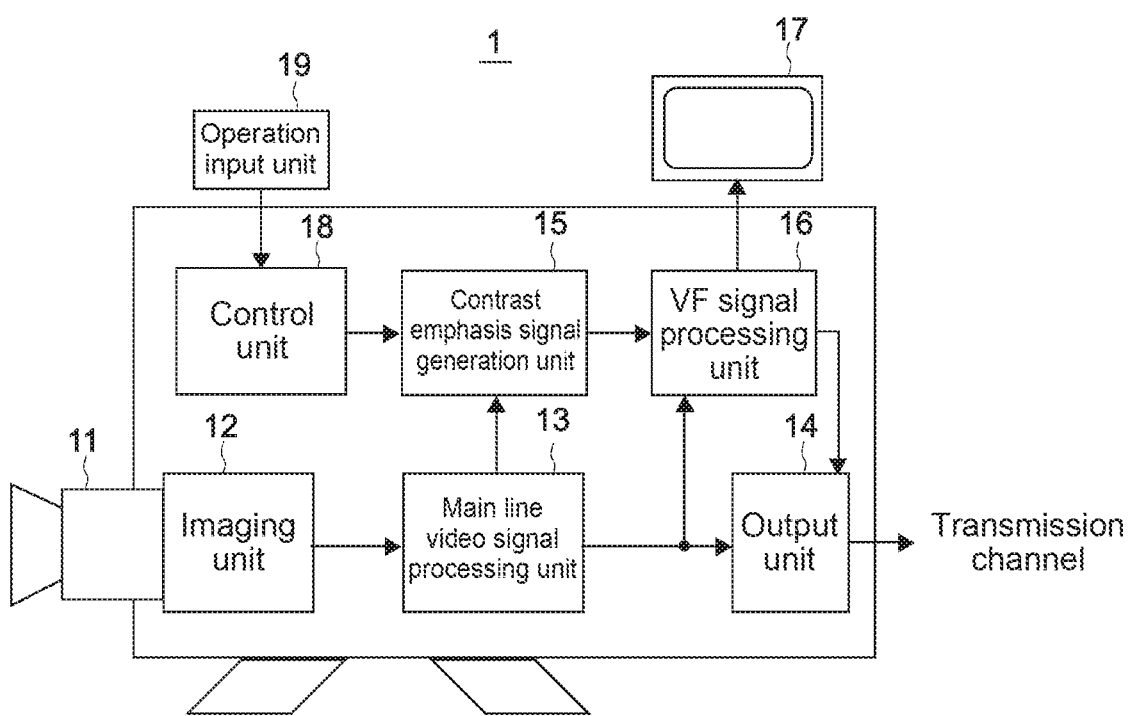
FIG. 1 is a block diagram showing the configurations of the imaging device of a first embodiment according to the present technology.

FIG. 1 is a block diagram showing the configurations of the imaging device of a first embodiment according to the present technology.

An imaging device 1 includes an optical block 11, an imaging unit 12, a main line video signal processing unit 13, an output unit 14, a contrast emphasis signal generation unit 15, a VF signal processing unit 16, a VF (View Finder) 17, a control unit 18, and an operation input unit 19.

The optical block 11 has a lens, a focus adjustment mechanism, a shutter mechanism, an aperture (iris) mechanism, or the like. The optical block 11 forms an image of reflected light from a subject on the imaging surface of the imaging element of the imaging unit 12 with a lens.

The imaging unit 12 has an imaging element, an analog signal processing circuit, an A/D conversion circuit, or the like. The imaging element includes a CCD (Charge Coupled Device) imaging sensor, a CMOS (Complementary Metal Oxide Semiconductor) image sensor, or the like. The imaging element is an imaging element capable of obtaining, for example, a HDR (High Dynamic Range) pixel signal. The pixel signal obtained by the imaging element of the imaging unit 12 is supplied to the main line video signal processing unit 13.

The main line video signal processing unit 13 corresponds to a "first video signal processing unit" in claims and performs, for example, signal processing such as defect correction, noise elimination, lens aberration correction, A/D conversion, and RAW development on the HDR pixel signal supplied from the imaging unit 12 to generate a HDR video signal. The generated first video signal is supplied to the output unit 14, the contrast emphasis signal generation unit 15, and the VF signal processing unit 16.

The output unit 14 performs processing to output the HDR video signal obtained by the main line video signal processing unit 13 to external video equipment such as a CCU (Camera Control Unit) or a display via a camera cable. The CCU receives the HDR video signal or the like transmitted from the imaging device 1 via the camera cable and performs, for example, processing to convert the received signal into a digital video signal or an analog video signal in a form suitable for transmission and transmit the same, or the like. Further, the output unit 14 is capable of outputting a VF video signal generated by the VF signal processing unit 16 to an external display or the like.

Note that the HDR video signal obtained by the main line video signal processing unit 13 may be recorded on a recording medium such as a SSD (Solid State Drive).

The contrast emphasis signal generation unit 15 extracts at least a high-pass luminance change component of a high luminance portion from the HDR video signal obtained by the main line video signal processing unit 13 and generates a signal obtained by multiplying the extracted luminance change component by a prescribed gain as a contrast emphasis signal. The generated contrast emphasis signal is supplied to the VF signal processing unit 16. Here, the high luminance portion is a region in which luminance exceeds a prescribed threshold in the HDR video signal.

The VF signal processing unit 16 performs, for example, knee correction or the like on the high luminance portion of the HDR video signal obtained by the main line video signal processing unit 13 to generate a SDR luminance reduction video signal. The VF signal processing unit 16 adds the contrast emphasis signal supplied from the contrast emphasis signal generation unit 15 to the luminance reduction video signal to generate a SDR video signal and performs other signal processing such as synthesizing characters and markers on the signal to be supplied to the VF 17 as a VF video signal.

The operation input unit 19 is a unit that receives the input of instructions, various settings, or the like for operating the imaging device 1 from a user and includes, for example, buttons, switches, dials, a touch panel sensor provided on the screen of the VF 17, or the like.

The control unit 18 is a controller for controlling the respective units of the imaging device 1 and includes a CPU (Central Processing Unit), a RAM (Random Access Memory), a ROM (Read Only Memory), or the like. The RAM or the ROM stores a program performed by the CPU, various parameters, or the like. The control unit 18 interprets information on the input of a user's operation received by the operation input unit 19 and controls the imaging device 1 according to the interpreted information.

The above contrast emphasis signal generation unit 15 and the VF signal processing unit 16 correspond to a "second video signal processing unit" in the claims. Accordingly, the contrast emphasis signal generation unit 15 and the VF signal processing unit 16 may be configured as one unit.

[Problem]

Figure 2:
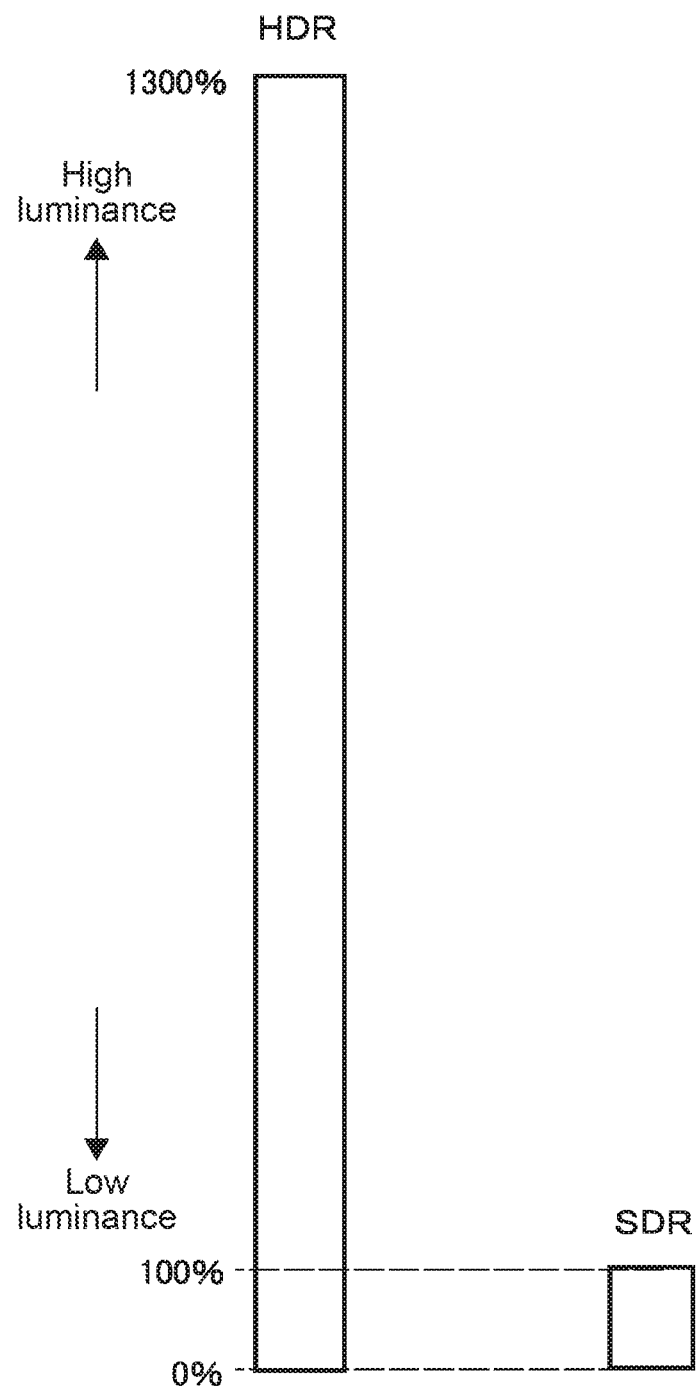
FIG. 2 is a diagram in which a HDR and a SDR are shown in comparison with each other.

FIG. 2 is a diagram in which a HDR and a SDR are shown in comparison with each other.

Figure 3:
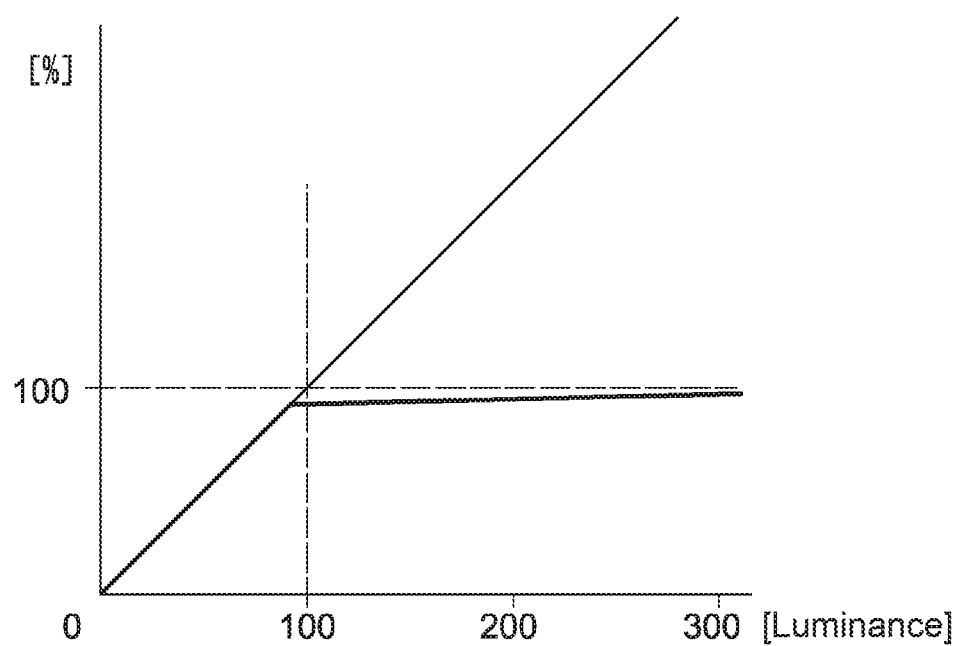
FIG. 3 is a diagram showing knee correction performed on a HDR video signal by a VF signal processing unit 16.

When it is assumed that the range of the SDR is 100%, the range of the HDR is, for example, 800%, 1000%, 1300, or the like. Accordingly, as a method for generating a SDR video signal from a HDR video signal, there has been known a method for performing knee correction on a high luminance portion having a prescribed luminance value (knee correction point) or more of the HDR video signal as shown in FIG. 3. However, according to the method, the contrast of a high luminance portion of the video signal obtained by the knee correction is remarkably reduced. Therefore, a problem occurs in display video as follows.

Figure 4:
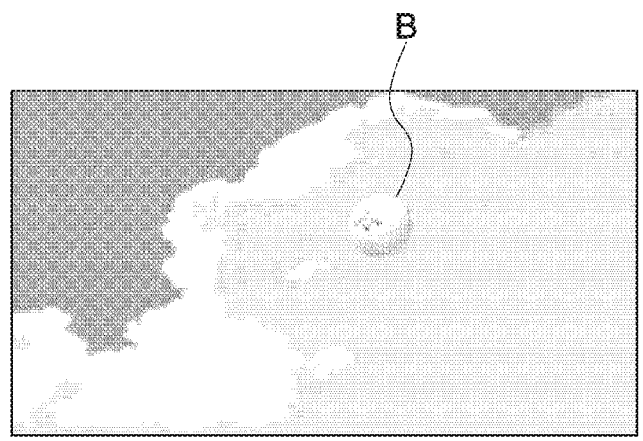
FIG. 4 is a diagram showing the display video of a HDR video signal.
Figure 5:
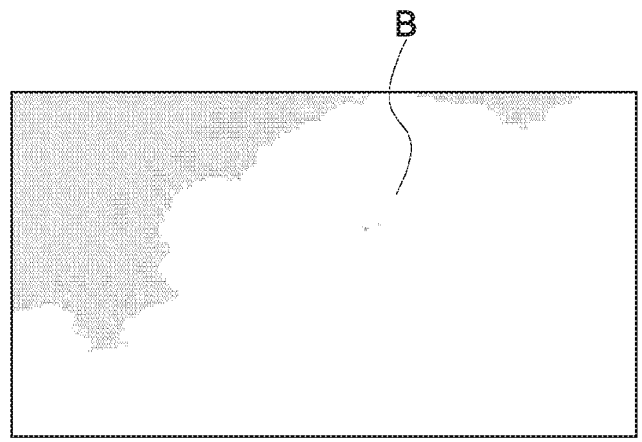
FIG. 5 is a diagram showing the display video of a SDR video signal obtained by knee correction performed on the HDR video signal.

FIG. 4 is a diagram showing the display video of a HDR video signal, and FIG. 5 is a diagram showing the display video of a SDR video signal obtained by performing knee correction on the HDR video signal. In the display video of the HDR video signal shown in FIG. 4, a white ball B in the air that corresponds to a high luminance portion can be discriminated. However, in the display video obtained by the knee correction, the ball B is hardly discriminated due to a remarkable reduction in the contrast of the high luminance portion. Accordingly, the ball B flying in the air is hardly tracked through the visual recognition of the display video of the VF 17.

Note that although the display of the HDR video signal on the VF 17 does not cause a technical problem, it is said that the display of the HDR video places a large burden on the eyes of a shooter when the shooter continuously stares the HDR video and is undesirable in health. Accordingly, countermeasures for addressing the above problem with SDR video have been expected.

In view of the above problem, the imaging device 1 of the present embodiment is configured to include the contrast emphasis signal generation unit 15 and the VF signal processing unit 16 that generate the information signal of the high-pass luminance change component of at least a high luminance portion from a HDR video signal as a contrast emphasis signal, generate a SDR luminance reduction video signal with a reduction in a luminance value of a high luminance portion of the HDR video signal, and generate a second video signal by the addition of the SDR luminance reduction video signal to the contrast emphasis signal.

Figure 6:
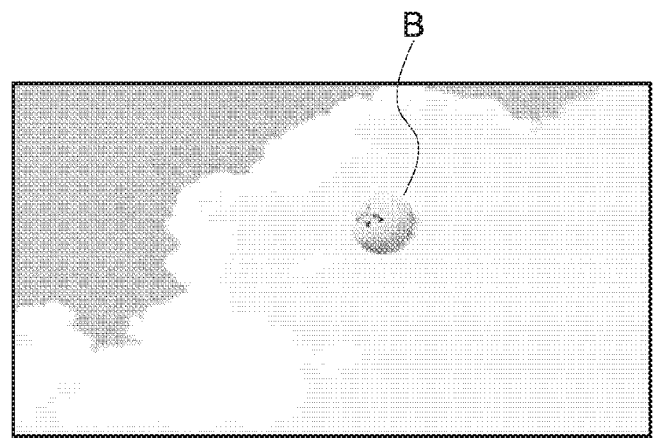
FIG. 6 is a diagram showing the display video of a second video signal in which the contrast of a high luminance portion is emphasized.

FIG. 6 is a diagram showing the display video of a SDR video signal generated by the contrast emphasis signal generation unit 15 and the VF signal processing unit 16. As shown in the figure, it is understood that the white ball B in the air is made discriminable in the video by the acquisition of the SDR video signal in which the contrast of the high luminance portion is emphasized.

[Actions of Contrast Emphasis Signal Generation Unit 15 and VF Signal Processing Unit 16]

Next, the details of the actions of the above contrast emphasis signal generation unit 15 and the VF signal processing unit 16 will be described.

The VF signal processing unit 16 performs knee correction on a HDR video signal.

Figure 7:
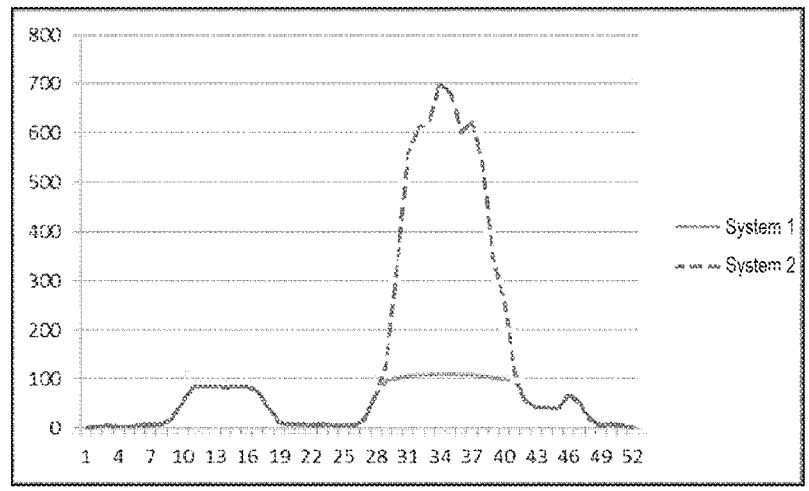
FIG. 7 is a diagram showing a luminance reduction video signal generated when knee correction is performed on the high luminance portion of a HDR video signal.

FIG. 7 is a diagram showing a luminance reduction video signal generated when knee correction is performed on a high luminance portion of a HDR video signal (for example, a high luminance portion of 95% or more of a SDR), in which the horizontal axis of the diagram is the time axis of the HDR video signal and the vertical axis thereof is luminance. A dotted line is the HDR video signal (system 2) of the high luminance portion before the knee correction is performed on the HDR video signal, and a solid line is the luminance reduction video signal (system 1) obtained after the knee correction is performed on the HDR video signal.

Figure 8:
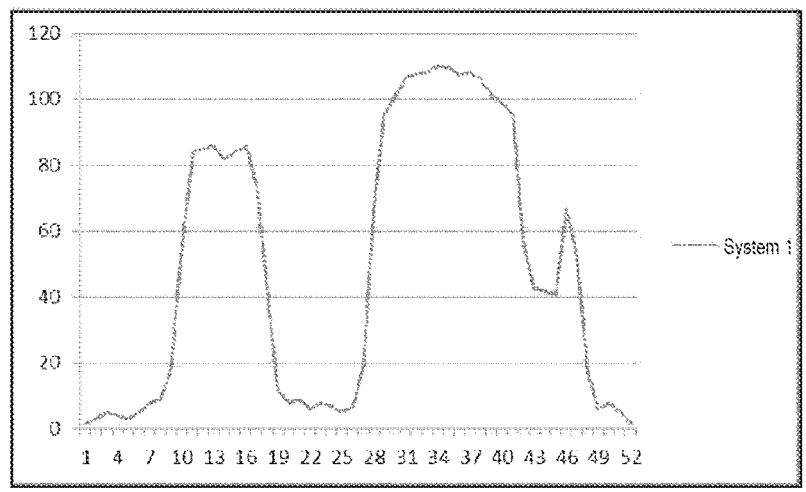
FIG. 8 is a diagram in which the luminance reduction video signal (system 1) of FIG. 7 is shown with a different luminance scale.

FIG. 8 is a diagram in which the luminance reduction video signal (system 1) of FIG. 7 is shown with a different luminance scale. It is understood that the contrast of the high luminance portion of the video signal has been deteriorated by the knee correction.

Figure 9:
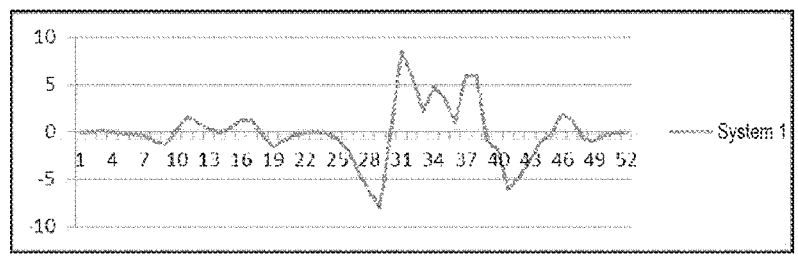
FIG. 9 is a diagram showing a contrast emphasis signal generated by a contrast emphasis signal generation unit 15.

FIG. 9 is a diagram showing a contrast emphasis signal generated by the contrast emphasis signal generation unit 15. The contrast emphasis signal generation unit 15 extracts a high-pass luminance change component from a HDR video signal obtained by the main line video signal processing unit 13 using, for example, a high-pass filter or the like and generates a signal obtained by multiplying the extracted luminance change component by a prescribed gain as a contrast emphasis signal. A value of the gain given here may be a fixed value or a variable value set by a user using the operation input unit 19. The contrast emphasis signal shown in this example is one obtained by, for example, compressing the signal of the luminance change component by one-fifteenth.

The contrast emphasis signal generated by the contrast emphasis signal generation unit 15 is output to the VF signal processing unit 16 and then added to a luminance reduction video signal obtained by knee correction in the VF signal processing unit 16 to obtain a SDR video signal.

Figure 10:
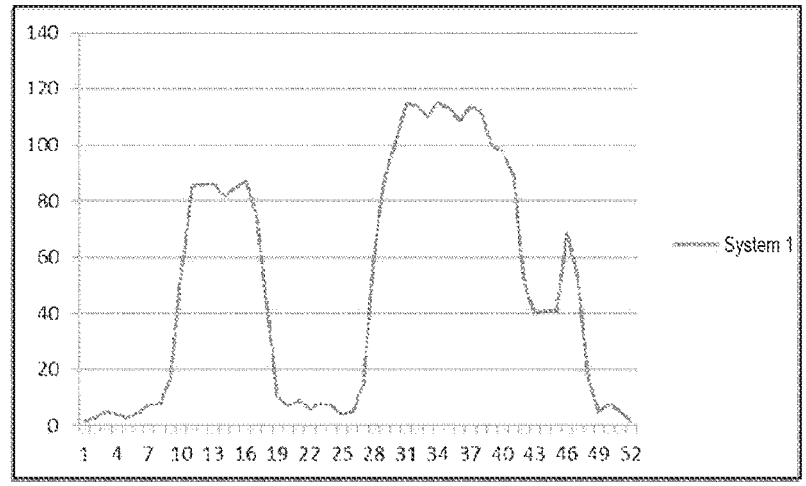
FIG. 10 is a diagram showing a SDR video signal obtained by adding a contrast emphasis signal to a luminance reduction video signal.

FIG. 10 is a diagram showing a SDR video signal obtained by adding a contrast emphasis signal to a luminance reduction video signal. Thus, the SDR video signal in which the contrast of a high luminance portion is emphasized is obtained by the addition of the contrast emphasis signal to the luminance reduction video signal.

Modified Example 1

In the above embodiment, a high-pass luminance change component is extracted from a HDR video signal using a high-pass filter to generate a contrast emphasis signal. However, since contrast is reduced at a high luminance portion when knee correction is performed on the HDR video signal, it is ideal that the extraction of the high-pass luminance change component from the HDR video signal is performed only from the high luminance portion.

Figure 11:
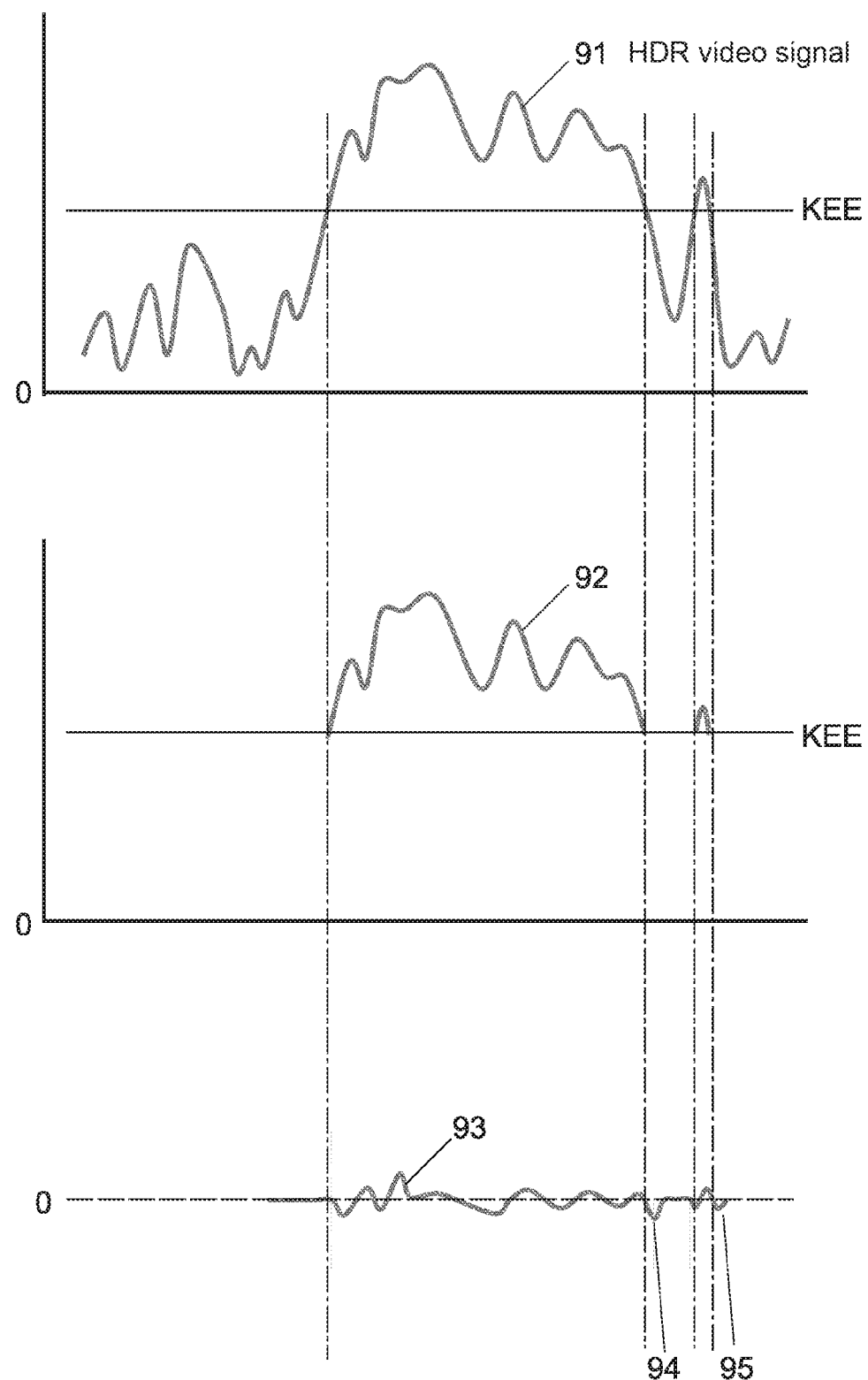
FIG. 11 is a diagram for describing a modified example 1 of a method for extracting a high-pass luminance change component from a HDR video signal.

Accordingly, as shown in FIG. 11, the contrast emphasis signal generation unit 15 may extract a video signal 92 of a high luminance portion above a knee correction point KEE from a HDR video signal 91 and then extract a high-pass luminance change component 93 from the HDR video signal 92 of the high luminance portion using a high-pass filter or the like.

Under the employment of the method, signals 94 and 95 not relevant to a change in the luminance of the HDR video signal could occur immediately after the HDR video signal passing through the high-pass filter has passed through the knee correction point KEE due to the characteristics of the high-pass filter. In order to eliminate the signals 94 and 95, the contrast emphasis signal generation unit 15 desirably reduces gains in periods other than the extraction period of the video signal 92 of the high luminance portion when a gain is multiplied.

Modified Example 2

As another method for generating the information signal of a high-pass luminance change component of at least a high luminance portion from a HDR video signal, there has been known a method in which a low-pass luminance change component is extracted and subtracted from the HDR video signal using a low-pass filter.

Modified Example 3

As another method for generating a SDR video signal from a HDR video signal, there has been known a method in which Log characteristics where a compression ratio of contrast increases with an increase in luminance are given to the HDR video signal instead of performing knee correction, or the like.

Modified Example 4

In the above embodiment, when a background portion and a foreground portion such as a ball have the same luminance but have different colors, a significant contrast emphasis signal cannot be obtained since there is no difference in the contrast of the luminance.

Accordingly, it may be possible to generate a plurality of luminance signals from a color video signal according to a plurality of calculation methods in units of pixels or in units of n pixels and select a luminance signal having the largest absolute value in units of pixels or in units of n pixels to generate the information signal of a high-pass luminance change component.

The contrast emphasis signal generation unit 15 generates the two types of luminance signals Y and Y' according to, for example, a general luminance calculation formula and another luminance calculation formula below.

$$Y=0.299R+0.587G+0.114B$$

$$Y'=0.333R+0.333G+0.333B$$

The contrast emphasis signal generation unit 15 employs a signal having a larger absolute value among the two types of the luminance signals Y and Y'.

Thus, a probability that a significant contrast emphasis signal is acquired becomes high, and the acquisition of a SDR video signal in which the contrast of a high luminance portion is emphasized is further assured.

Modified Example 5

In a SDR video signal obtained by performing knee correction, a portion on which the knee correction has been performed reaches the upper limit or the approximate upper limit of a SDR. Accordingly, a negative value rather than a positive value of a contrast emphasis signal operates to substantially generate contrast.

Accordingly, the contrast emphasis signal generation unit 15 may be configured to multiply a value of a high-pass luminance change component by a different gain depending on whether the value of the high-pass luminance change component extracted from a HDR video signal is positive or negative. Specifically, a second gain used when a value of a high-pass luminance change component is positive is only required to be smaller than a first gain used when the value of the high-pass luminance change component is negative.

Thus, a contrast emphasis signal can be beneficially added to a SDR video signal on which knee correction has been performed.

Modified Example 6

[User Settings on Block Connection Function]

In the imaging device 1 described above, the following settings on the above contrast emphasis function may be made by a user.

1. On/off contrast emphasis function
2. Gain value
3. Luminance calculation method The on/off the contrast emphasis function is a setting for switching the on/off state of the above contrast emphasis function.

The gain value is the setting of a gain value to be multiplied with respect to a high-pass luminance change component extracted from a HDR video signal.

The luminance calculation method is the setting of a luminance calculation method used to calculate luminance. The luminance calculation method can be selected from among, for example, a general luminance calculation formula and a special luminance calculation formula as described above.

A dial direction is the setting of a fluctuating direction of a gain value with respect to the rotation operating direction (the clockwise direction or the counterclockwise direction) of an operation element (dial) allocated to the setting of a gain.

Figure 12:
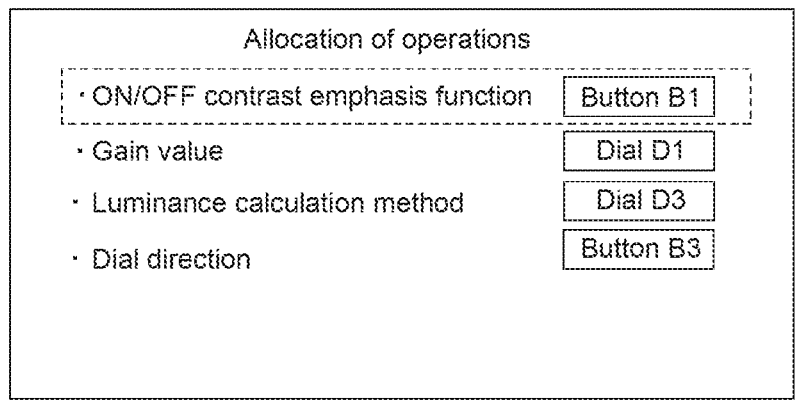
FIG. 12 is a diagram showing a UI screen for user settings relevant to a contrast emphasis function.

FIG. 12 is a diagram showing a UI (User Interface) screen for the above user settings.

Regarding the UI, the VF 17, an external display, or the like of the imaging device 1 is, for example, used as a UI display unit, and specific operation buttons or the like provided in the imaging device 1 are used as a setting input unit.

On the UI screen, a user is allowed to select an operation element to be allocated to each of setting items from among a plurality of operation element groups. The operation element groups allocatable to the setting items include a specific button group, a dial group, or the like provided in the operation input unit 19 of the imaging device 1.

Figure 13:
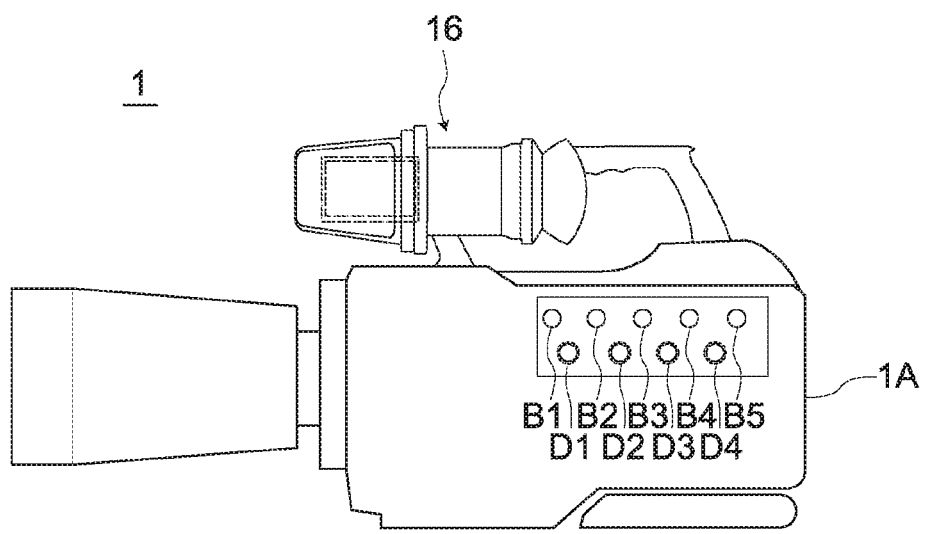
FIG. 13 is a side view showing operation elements relevant to the contrast emphasis function of an imaging device 1.

FIG. 13 is a side view showing operation elements relevant to the contrast emphasis function of the imaging device 1. As shown in the figure, the imaging device 1 includes a plurality of buttons B1, B2, B3, B4, and B5 and a plurality of dials D1, D2, D3, and D4 as operation element groups to which the respective setting items relevant to the contrast emphasis function are allocatable.

Note that although a case in which the operation element groups are provided on the lateral surface of a body 1A of the imaging device 1 is shown in the figure, the operation element groups may be provided on other surfaces such as the upper surface of the imaging device 1 or may be provided on the VF 17.

Next, a method for allocating any operation element to any setting item in the operation element groups of the imaging device 1 on the UI screen shown in FIG. 12 by a user will be described.

Note that a case in which an initial value of an operation element is set for each of the setting items is assumed in the UI screen shown in FIG. 12. For example, the operation element of the button B1, the operation element of the dial D1, the operation element of the dial D3, and the button B3 are set as initial values in the setting of the on/off state of the contrast emphasis function, the setting of the gain value, the setting of the luminance calculation method, and the setting of the dial direction, respectively.

Figure 14:
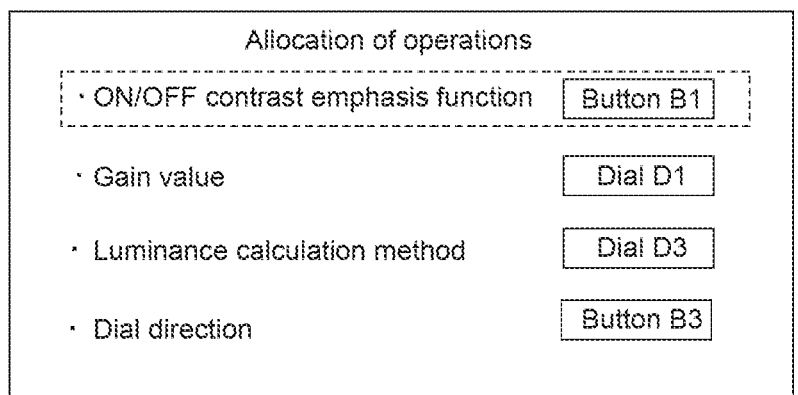
FIG. 14 is a diagram showing an operation method performed when an operation element is changed on the UI screen shown in FIG. 12.
Figure 14:
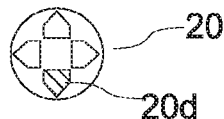
Figure 14:
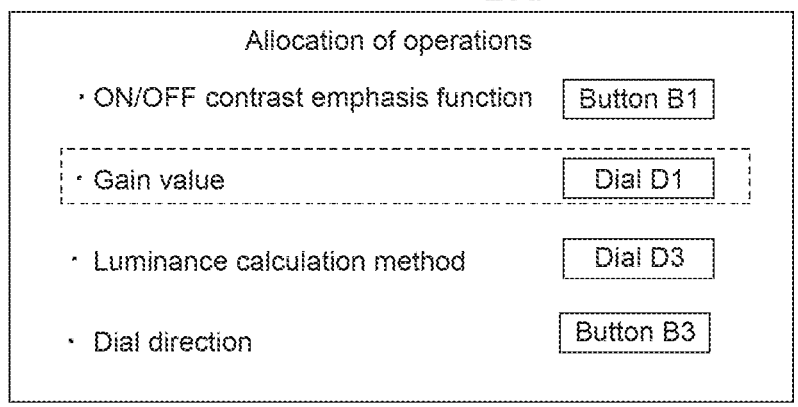
Figure 14:
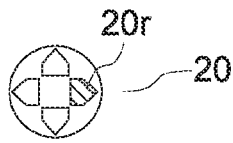
Figure 14:
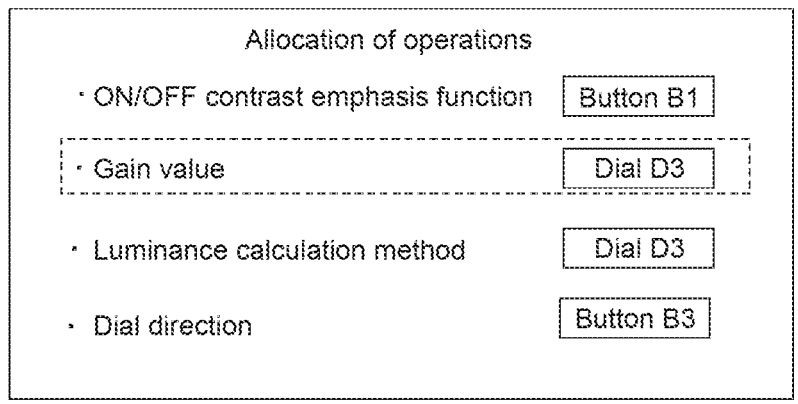

FIG. 14 is a diagram showing an operation method performed when an operation element allocated to the setting of the gain value is changed from the dial D1 to the dial D3 on the UI screen shown in FIG. 12.

On the UI screen, the user selects a setting item about which an operation element is desired to be changed by operating, for example, a cursor key 20 or the like provided in the operation input unit 19. For example, when a downward key 20d of the cursor key 20 is pressed once, a setting item about which an operation element is to be changed moves from the on/off of the contrast emphasis function to the gain value. Next, when a rightward key 20r of the cursor key 20 is pressed once, the display of the operation element with respect to the setting item of a block size is changed from the dial D1 to the dial D3. Thus, the allocation of the operation element with respect to the setting item of the gain value is changed from the dial D1 to the dial D3. Note that the display of the operation element with respect to the setting item of the gain value is changed from the dial D1 to the dial D4 when the rightward key 20r of the cursor key 20 is pressed twice. Thus, the allocation of the operation element with respect to the transverse setting item of the block size is changed from the dial D1 to the dial D4. In the same manner, the allocation of operation elements with respect to other setting items can also be changed.

Figure 15:
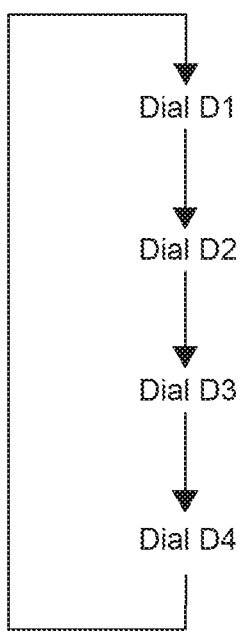
FIG. 15 is a diagram showing a switching order among a plurality of dials on the UI screen shown in FIG. 12.
Figure 16:
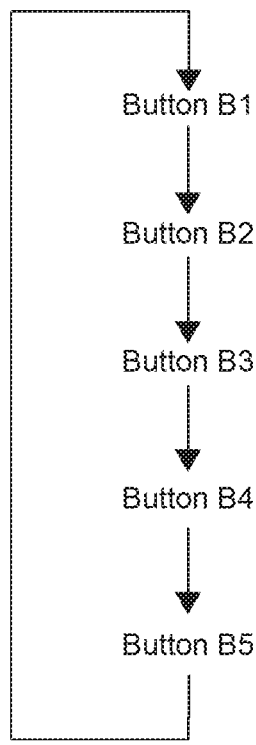
FIG. 16 is a diagram showing a switching order among a plurality of buttons on the UI screen shown in FIG. 12.

FIG. 15 is a diagram showing a switching order among the plurality of dials D1 to D4. When a dial before a setting change is the dial D1, the selected dial is switched in order of the dial D2, the dial D3, the dial D4, and the dial D1 every time the rightward key 20r of the cursor 20 is pressed once. Further, as shown in FIG. 16, the buttons B1 to B5 are switched in the same manner.

Figure 17:
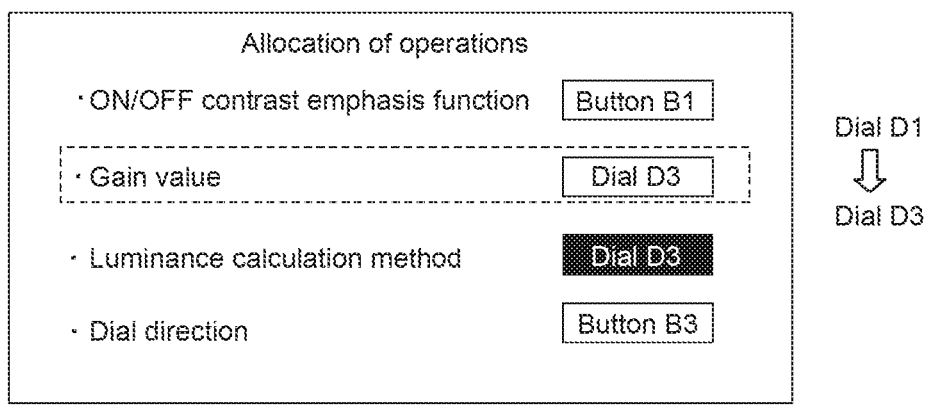
FIG. 17 is a diagram showing a display example of a case in which the overlapped setting of an operation element occurs on the UI screen shown in FIG. 12.

Note that when the allocation of an operation element with respect to the setting item of the gain value is changed from the dial D1 to the dial D3, the operation element overlaps an operation element allocated to the setting of the luminance calculation method. If any overlap between operation elements for a plurality of setting items occurs as described above, an operation item (for example, the setting item of the luminance calculation method) to which an operation element has been allocated is displayed in reverse video or the like to be discriminable as shown in FIG. 17 so that the setting change of the operation element of the operation item is urged. Thus, the user is allowed to change the allocation of an operation element so as to avoid the overlapped setting of the operation element.

[Real-Time Reflection on VF Video Generation Accompanied by Setting Change]

At the time of shooting, the user can change the emphasis degree of the contrast of a second video signal displayed on the VF 17, an external display, or the like in real time by operating respective operation elements allocated to the respective setting items relevant to the contrast emphasis function. Thus, the user can select setting values most suitable for focus adjustment based on visual recognition.

That is, the control unit 18 detects each of the states of the respective operation elements separately allocated to the respective setting items relevant to the contrast emphasis function in the operation input unit 19. The control unit 18 generates respective setting values corresponding to the detected states and sets the generated setting values in the contrast emphasis signal generation unit 15. The contrast emphasis signal generation unit 15 generates a contrast emphasis signal on the basis of the respective setting values given by the control unit 18 and outputs the generated contrast emphasis signal to the VF signal processing unit 16.

Second Embodiment

Next, a second embodiment according to the present technology will be described.

Figure 18:
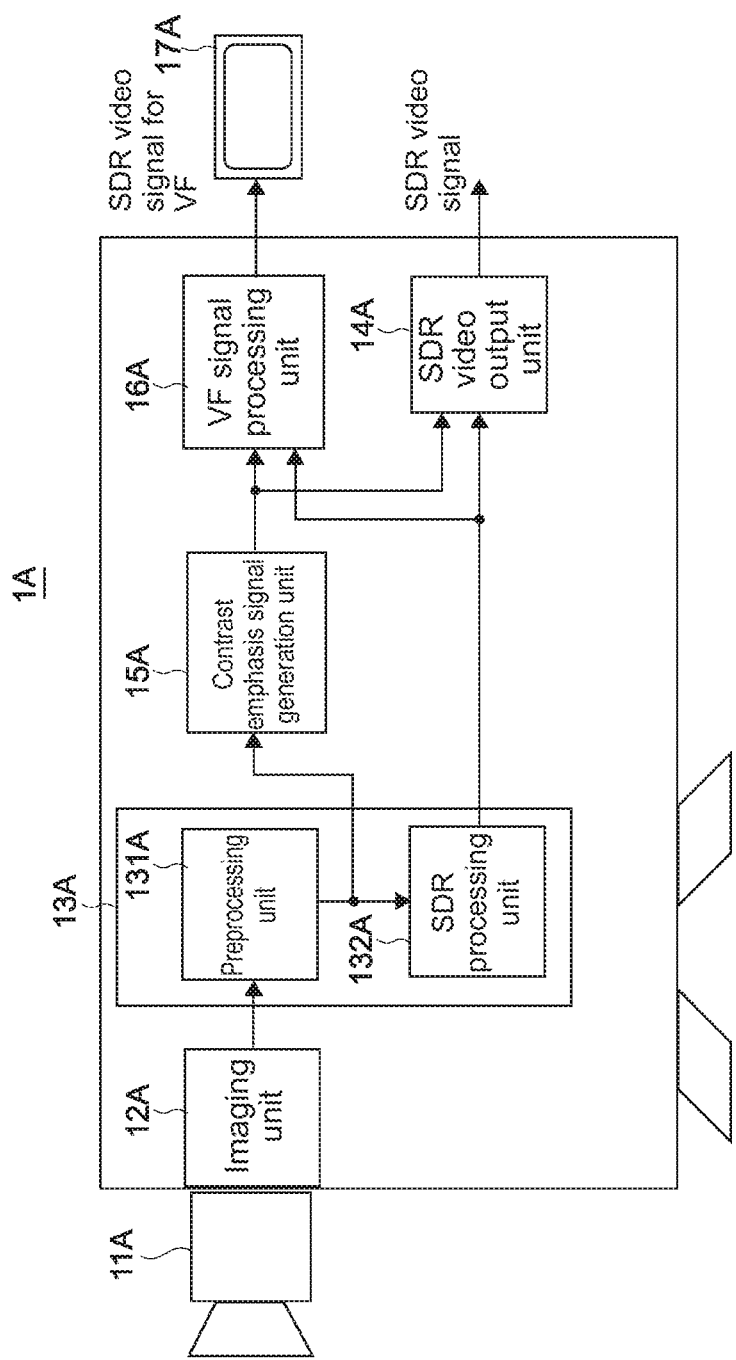
FIG. 18 is a block diagram showing the configurations of an imaging device 1A of a second embodiment according to the present technology.

FIG. 18 is a block diagram showing the configurations of an imaging device 1A of the second embodiment.

As shown in the figure, the imaging device 1A has an optical block 11A, an imaging unit 12A, a main line video signal processing unit 13A having a preprocessing unit 131A and a SDR processing unit 132A, a SDR video output unit 14A, a contrast emphasis signal generation unit 15A, a VF video output unit 16A, and a VF 17.

The imaging unit 12A outputs the pixel signal of a dynamic range wider than the dynamic range of the output video of the imaging device 1A. When it is assumed that the dynamic range of the output video of the imaging device 1A is 100% as a SDR, the dynamic range of the pixel signal output from the imaging element 12A may be in the range of, for example, 600% to 1300%.

The preprocessing unit 131A performs, for example, various types of correction such as defect correction, noise elimination, and lens aberration correction and preprocessing for forming an image such as white balance processing and amplification with a master gain on the pixel signal supplied from the imaging unit 12A.

The SDR processing unit 132 generates a SDR video signal from a video signal output from the preprocessing unit 131A.

The contrast emphasis signal generation unit 15A extracts a high-pass luminance change component of at least a high luminance portion from the pixel signal output from the preprocessing unit 131A of the main line video signal processing unit 13A and generates a signal obtained by multiplying the extracted luminance change component by a prescribed gain as a contrast emphasis signal. The generated contrast emphasis signal is supplied to the VF video output unit 16A.

The VF video output unit 16A adds the contrast emphasis signal generated by the contrast emphasis signal generation unit 15A to the SDR video signal obtained by the SDR processing unit 132A to obtain a SDR video signal in which contrast is emphasized, and performs other signal processing such as synthesizing characters and markers on the signal to be supplied to the VF 17A as a VF video signal.

Figure 19:
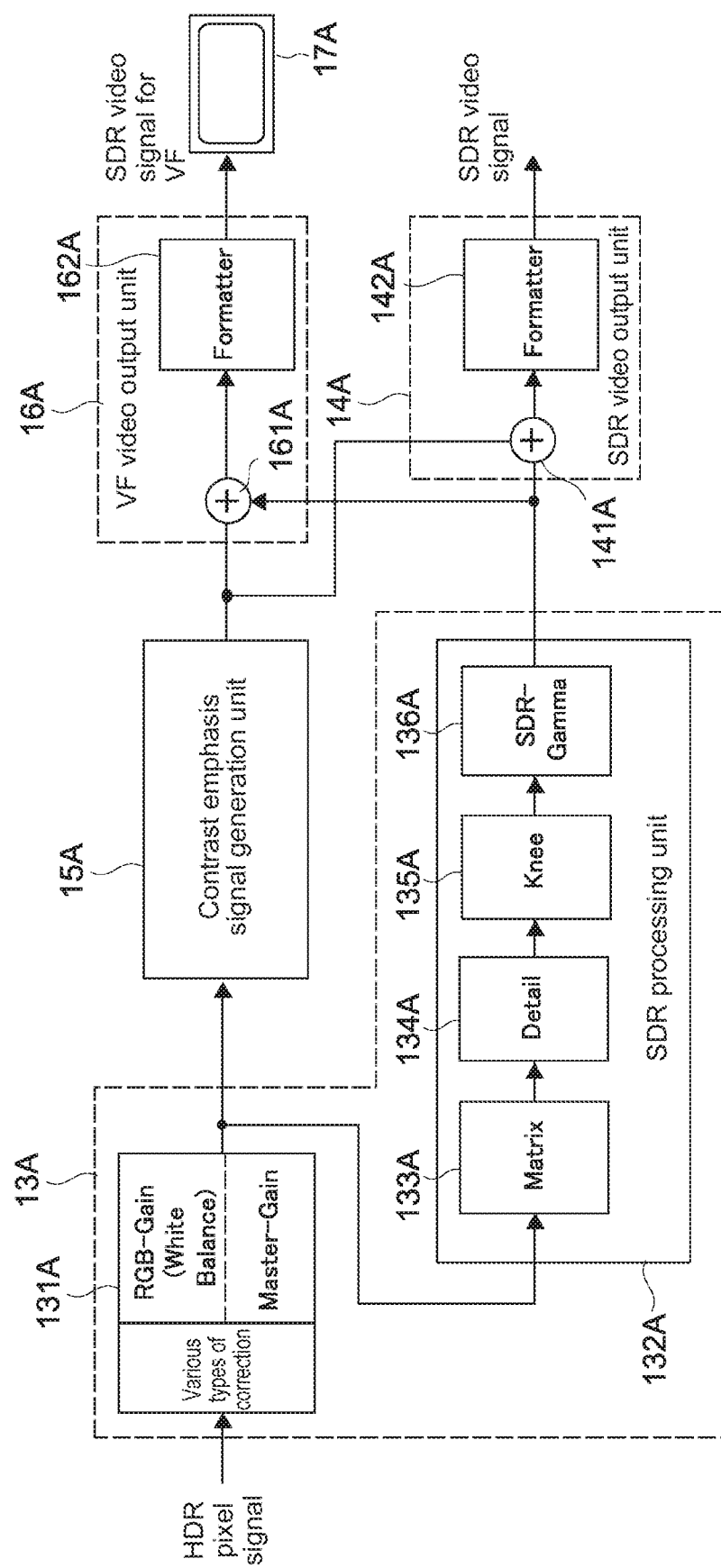
FIG. 19 is a block diagram showing the more detailed configurations of the imaging device 1A of FIG. 18.

FIG. 19 is a block diagram showing the more detailed configurations of the imaging device 1A. As shown in the figure, the SDR processing unit 132A has a matrix processing part 133A, a detail processing part 134A, a knee processing part 135A, and a SDR gamma processing part 136A.

The matrix processing part 133A performs debayer processing, linear matrix processing, or the like on the video signal output from the preprocessing unit 131A to generate color image data.

The detail processing part 134A performs detail processing on the color image data.

The knee correction part 135A performs knee (KNEE) correction on the color image data after the detail processing to generate a SDR video signal in which a luminance value of a high luminance portion is reduced.

The SDR gamma processing part 136A performs gamma processing for display on the SDR video signal.

The SDR video signal generated by the SDR processing unit 132A is supplied to both the SDR video output unit 14A and the VF video output unit 16A.

The SDR video output unit 14A has an adder 141A and a formatter 142A. The adder 141A adds the contrast emphasis signal generated by the contrast emphasis signal generation unit 15A to the SDR video signal generated by the SDR processing unit 132A to generate a SDR video signal in which contrast is emphasized, and supplies the generated SDR video signal to the formatter 142A. The formatter 142A performs processing to convert the SDR video signal in which the contrast is emphasized into a transmission format and output the converted signal to external video equipment such as a CCU (Camera Control Unit) or a display via a camera cable.

The CCU performs processing to receive the SDR video signal or the like transmitted via the camera cable from the imaging device 1A and transmit the received signal after converting the same into, for example, a digital video signal or an analog video signal in a format suitable for transmission.

The VF video output unit 16A has an adder 161A and a formatter 162A. The adder 161A adds the contrast emphasis signal generated by the contrast emphasis signal generation unit 15A to the SDR video signal generated by the SDR processing unit 132A to generate a SDR video signal in which contrast is emphasized and supplies the generated SDR video signal to the formatter 162A. The formatter 162A converts the SDR video signal in which the contrast is emphasized into a transmission format for a VF and supplies the converted signal to the VF 17A.

As described above, the imaging device 1A of the present embodiment can generate a contrast emphasis signal from the output of the preprocessing unit 131A that performs preprocessing such as correction on a pixel signal from the imaging unit 12A and obtain SDR video for a VF output in which the contrast of a high luminance portion is emphasized.

Third Embodiment

Next, a third embodiment according to the present technology will be described.

Figure 20:
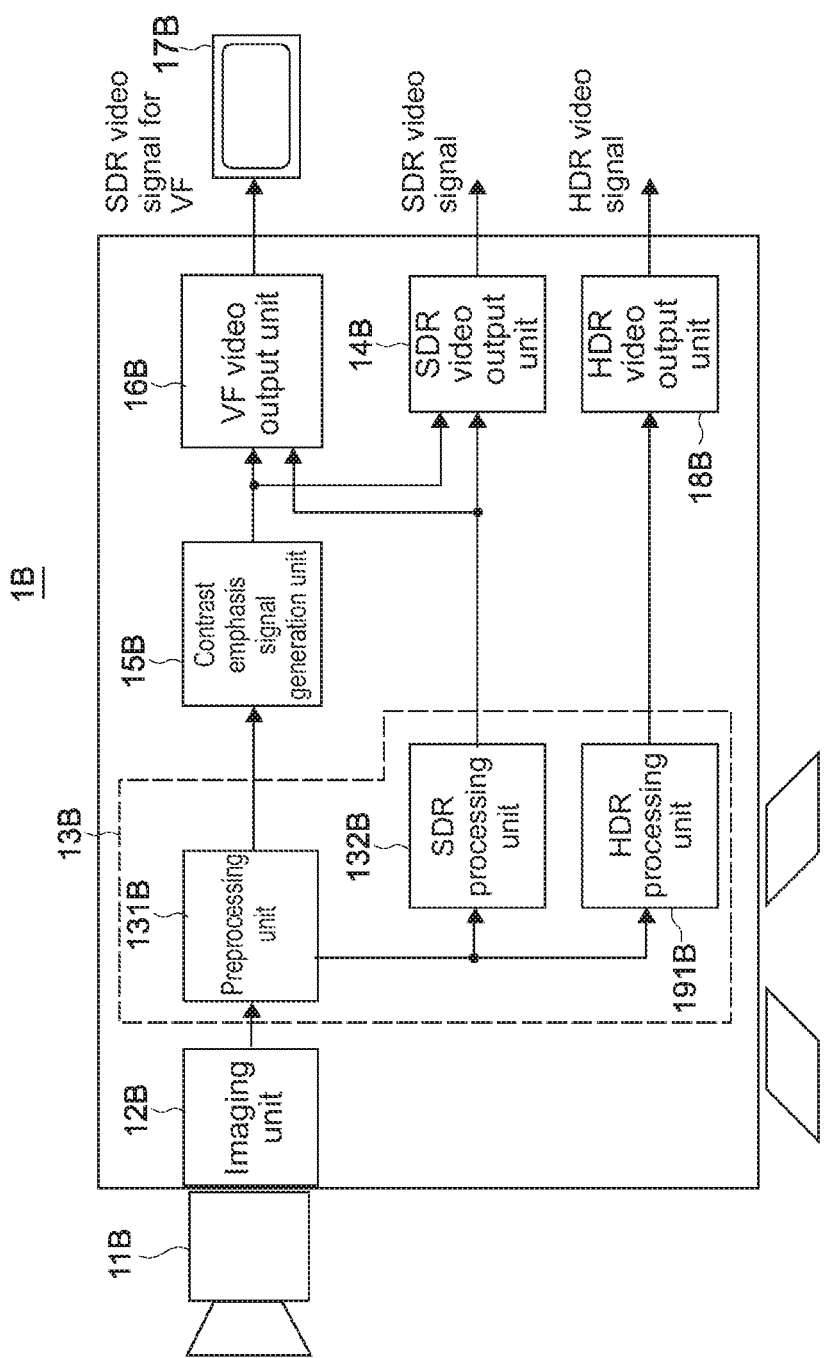
FIG. 20 is a block diagram showing the configurations of an imaging device 1B of a third embodiment.

FIG. 20 is a block diagram showing the configurations of an imaging device 1B of a third embodiment.

As shown in the figure, the imaging device 1B has an optical block 11B, an imaging unit 12B, a main line video signal processing unit 13B having a preprocessing unit 131B, a SDR processing unit 132B, and a HDR processing unit 191B, a SDR video output unit 14B, a contrast emphasis signal generation unit 15B, a VF video output unit 16B, a VF 17B, and a HDR video output unit 18B. That is, the imaging device 1B of the present embodiment is one in which a HDR processing unit 191B that generates a HDR video signal from a video signal output from the preprocessing unit 131B and the HDR video output unit 18B that transmits the HDR video signal obtained by the HDR processing unit 191B are mainly added to the imaging device 1A of the second embodiment.

Figure 21:
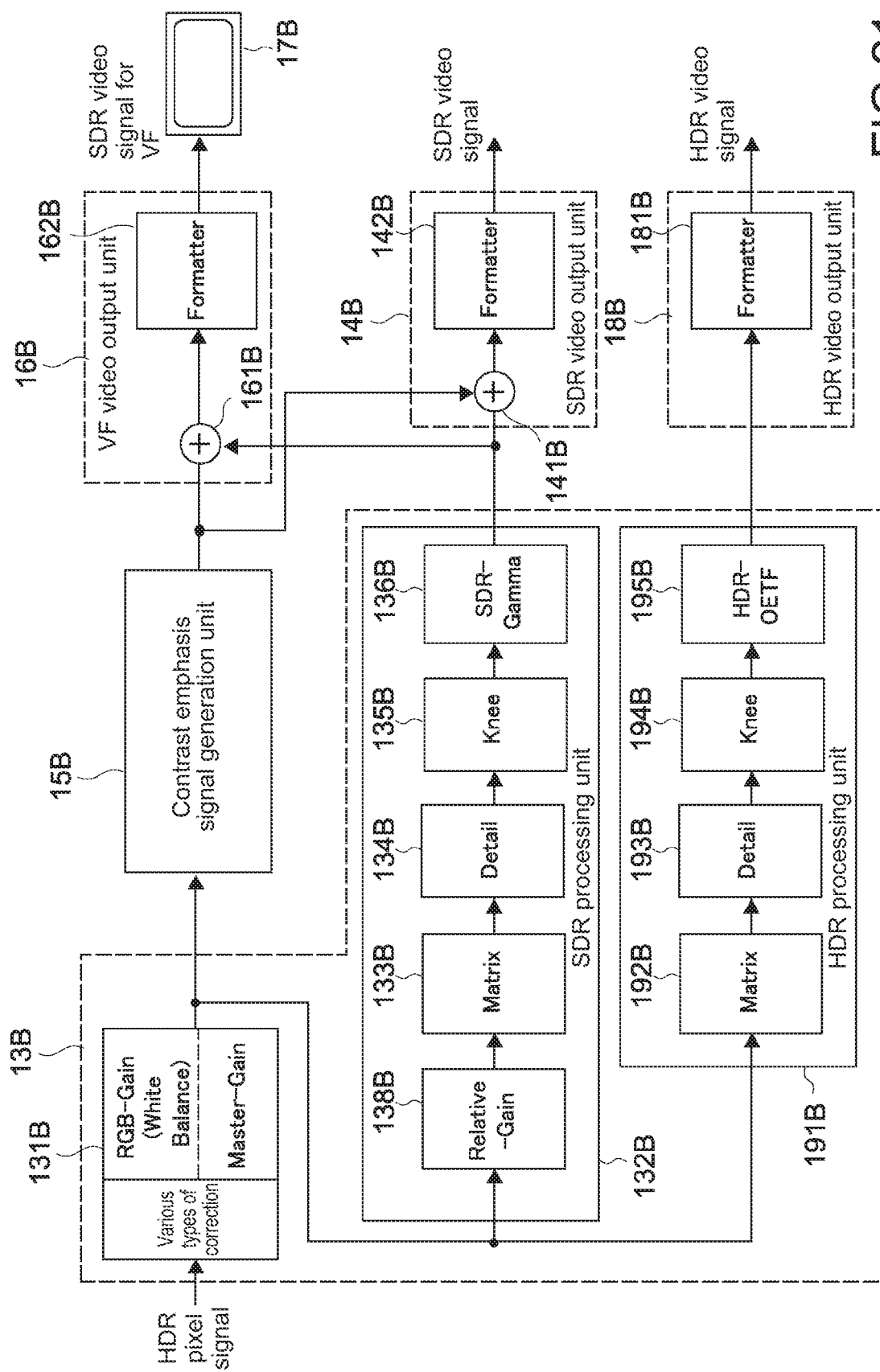
FIG. 21 is a block diagram showing the more detailed configurations of the imaging device 1B of the third embodiment.

FIG. 21 is a block diagram showing the more detailed configurations of the imaging device 1B of the third embodiment.

Here, a difference in configuration between the imaging device 1B of the third embodiment and the imaging device 1A of the second embodiment will be mainly described.

The HDR processing unit 191B has a matrix processing part 192B, a detail processing part 193B, a knee processing part 194B, and an OETF part 195B.

The matrix processing part 192B performs debayer processing, linear matrix processing, or the like on a video signal output from the preprocessing unit 131B to generate color image data.

The detail processing part 193B performs detail processing on the color image data.

The knee correction part 194B performs knee (KNEE) correction on the color image data after the detail processing.

The OETF part 195B performs gradation compression on the color image data using an OETF (Optical-Electro Transfer Function).

Note that the SDR processing unit 132B is different from the SDR processing unit 132A of the imaging device 1A of the second embodiment in that a SDR gain adjustment part 138B is added at the previous stage of the matrix processing part 133B, and is the same as the SDR processing unit 132A in the other configurations. The SDR gain adjustment part 138B adjusts the ratio of the master gain of the SDR gain adjustment part 138B to the master gain of the preprocessing part 131B on the basis of a relative gain with which the correlation of the dynamic range of SDR video relative to the dynamic range of HDR video is set. A video signal amplified by the master gain of the SDR gain adjustment part 138B is supplied to the matrix processing part 133B to be formed into a color image. After this, like the imaging device 1A of the second embodiment, a SDR video signal is generated by the detail processing part 134B, the knee processing part 135B, and the gamma processing part 136B, and the generated SDR video signal is supplied to both the SDR video output unit 14B and the VF video output unit 16B.

The SDR video output 14B, the VF video output unit 16, and the contrast emphasis signal generation unit 15B are the same as those of the imaging device 1A of the second embodiment and thus their duplicated descriptions will be omitted.

The imaging device 1B of the present embodiment can obtain HDR video for a main line output, besides a SDR video for a VF output and a main line output in which the contrast of a high luminance portion is emphasized.

Fourth Embodiment

[Imaging System]

Figure 22:
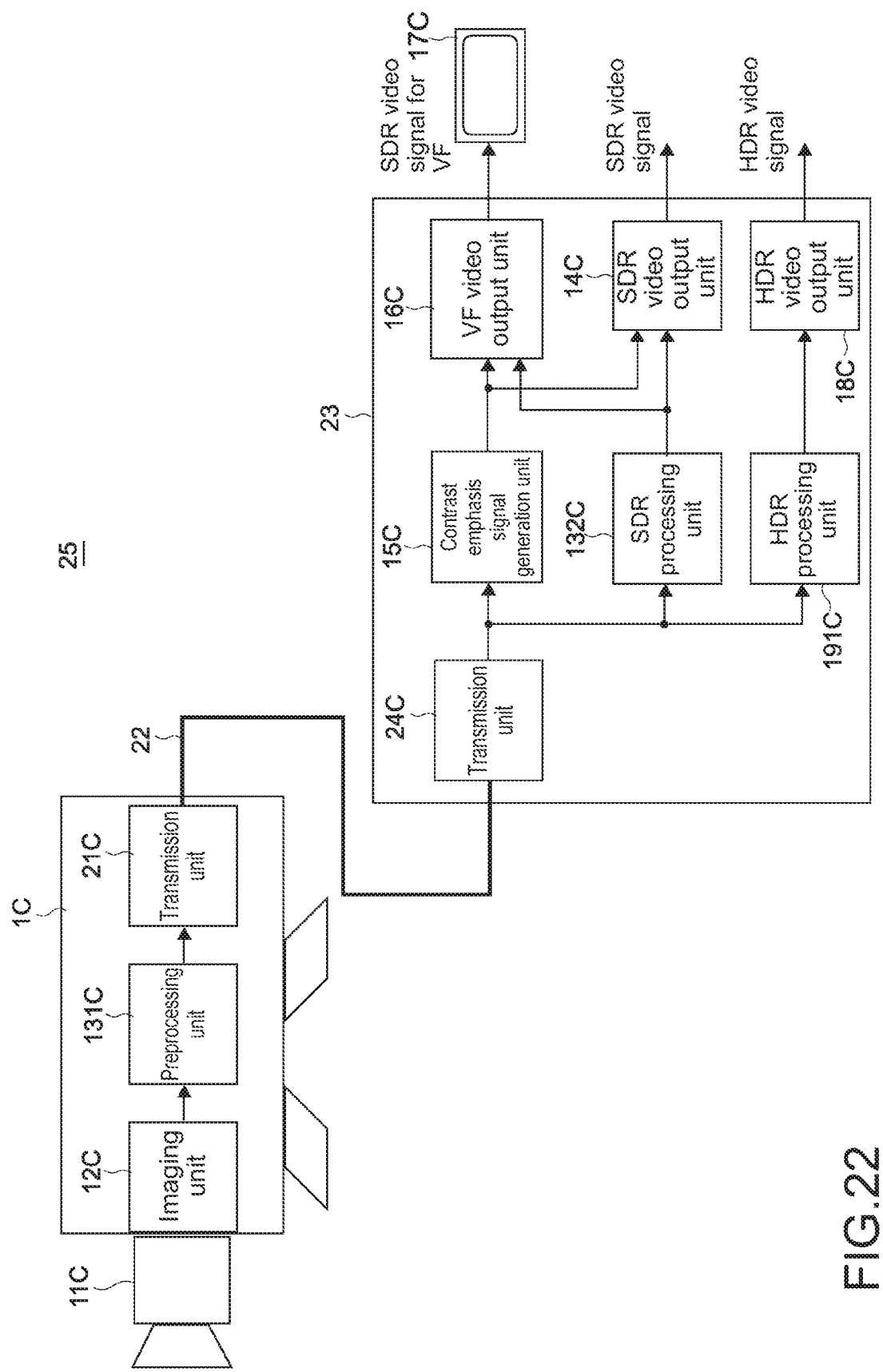
FIG. 22 is a block diagram showing the configurations of the imaging system of a fourth embodiment according to the present technology.

FIG. 22 is a block diagram showing the configurations of the imaging system of a fourth embodiment according to the present technology.

An imaging system 25 includes an imaging device 1C and a CCU (Camera Control Unit) 23. The imaging device 1C has an optical block 11C, an imaging unit 12C, a preprocessing unit 131C, and a transmission unit 21C. The transmission unit 21C of the imaging device 1C transmits a pixel signal obtained by the preprocessing unit 131C to the CCU 23 via a transmission channel 22 such as a camera cable.

The CCU 23 has a transmission unit 24C, a SDR processing unit 132C, a HDR processing unit 191C, a SDR video output unit 14C, a contrast emphasis signal generation unit 15C, a VF video output unit 16C, and a VF 17C. The CCU 23 receives the pixel signal transmitted from the imaging device 1C via the transmission channel 22 at the transmission unit 24C and supplies the same to the SDR processing unit 132C, the HDR processing unit 191C, and the contrast emphasis signal generation unit 15C.

In the imaging system 25 including the imaging device 1C and the CCU (Camera Control Unit) 23 as described above, SDR video for a VF output in which the contrast of a high luminance portion is emphasized can be obtained.

Next, a generation method for generating a contrast emphasis signal will be described.

[Generation Method 1 for Contrast Emphasis Signal]

Figure 23:
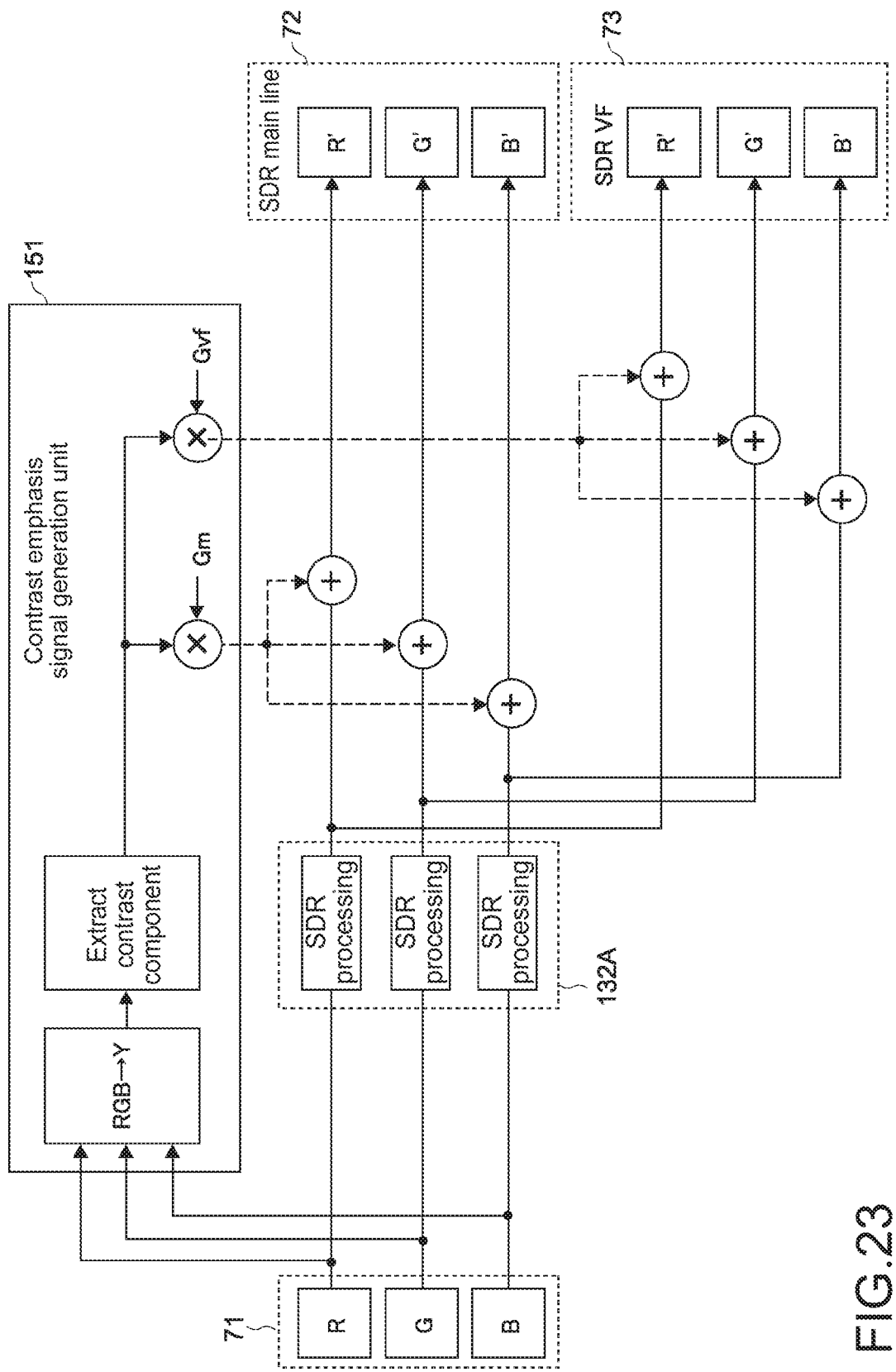
FIG. 23 is a diagram for describing a generation method 1 for a contrast emphasis signal.

FIG. 23 is a diagram showing a method for generating a contrast emphasis signal from an image luminance signal Y as a generation method 1 for a contrast emphasis signal.

The contrast emphasis signal generation unit 151 generates the luminance signal Y from an RGB pixel signal 71 output from a preprocessing unit and extracts a contrast component from the luminance signal Y. The contrast emphasis signal generation unit 151 multiplies a contrast component signal by gains Gm and Gvf to generate a contrast emphasis signal for a SDR main line and a contrast emphasis signal for a VF, respectively. The contrast emphasis signal for the SDR main line is added to a SDR video signal generated by a SDR processing unit 132A to become a SDR video signal 72 for the SDR main line. Further, the contrast emphasis signal for the VF is added to the SDR video signal generated by the SDR processing unit 132A to become a SDR video signal 73 for the VF.

[Generation Method 2 for Contrast Emphasis Signal]

Figure 24:
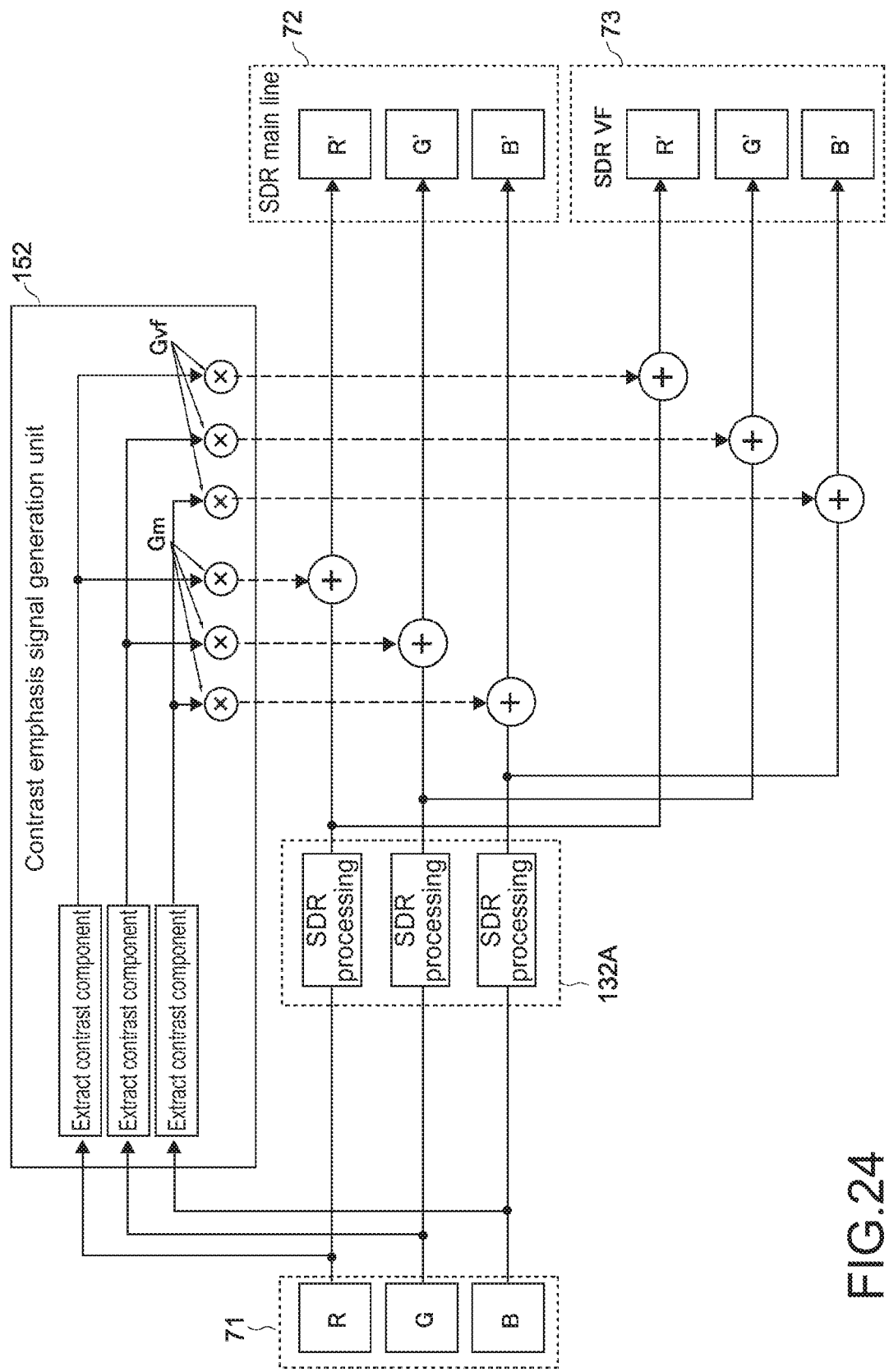
FIG. 24 is a diagram for describing a generation method 2 for a contrast emphasis signal.

FIG. 24 is a diagram showing a method for generating a contrast emphasis signal from a value of each of RGB of an image as a generation method 2 for a contrast emphasis signal.

A contrast emphasis signal generation unit 152 extracts a contrast component for each of RGB from a value for each of the RGB of an RGB pixel signal 71 output from a preprocessing unit. The contrast emphasis signal generation unit 152 multiplies a contrast component signal for each of the RGB by gains Gm and Gvf to generate a contrast emphasis signal for each of the RGB for a SDR main line and a contrast emphasis signal for each of the RGB for a VF, respectively.

The contrast emphasis signal for each of the RGB for the SDR main line is added to a SDR video signal generated by the SDR processing unit 132A for each of the RGB to become a SDR video signal 72 for the SDR main line.

Further, the contrast emphasis signal for each of the RGB for the VF is added to the SDR video signal generated by the SDR processing unit 132A for each of the RGB to become a SDR video signal 73 for the VF.

[Generation Method 3 for Contrast Emphasis Signal]

Figure 25:
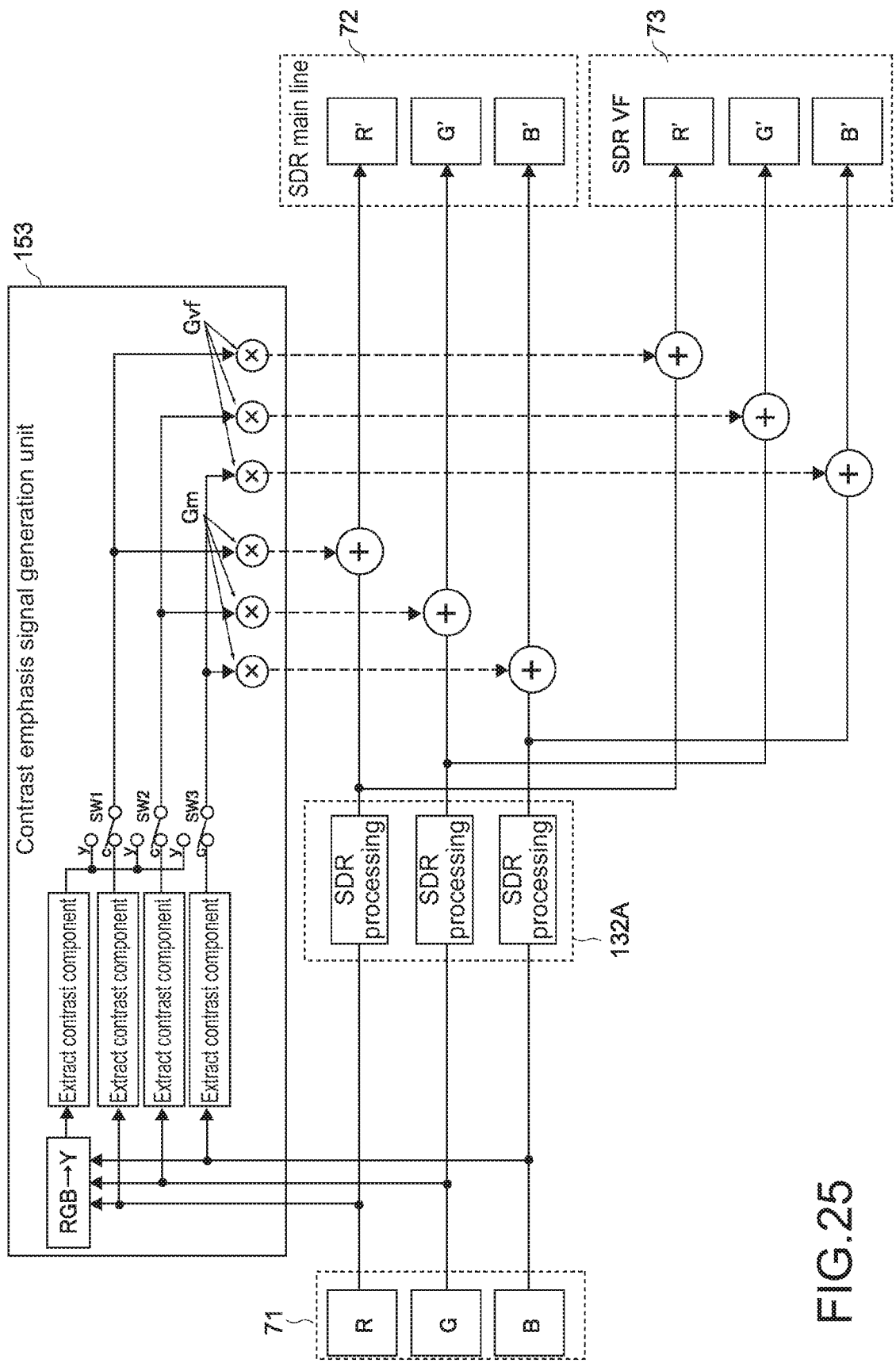
FIG. 25 is a diagram for describing a generation method 3 for a contrast emphasis signal.

In FIG. 25, a method for generating a contrast emphasis signal from a luminance signal Y of an image and a method for generating a contrast emphasis signal from a value of each of the RGB of the image are made switchable to each other.

A contrast emphasis signal generation unit 153 simultaneously switches SW1, SW2, and SW3 between a y-side and a c-side according to, for example, a selecting instruction provided from the user.

The switch SW1 is a switch for switching between a contrast component signal generated from a value of an R pixel and a contrast component signal generated from the luminance signal Y. The switch SW1 selects the contrast component signal generated from the value of the R pixel when the c-side is selected, and selects the contrast component signal generated from the luminance signal Y when the y-side is selected.

The switch SW2 is a switch for switching between a contrast component signal generated from a value of a G pixel and a contrast component signal generated from the luminance signal Y. The switch SW2 selects the contrast component signal generated from the value of the G pixel when the c-side is selected, and selects the contrast component signal generated from the luminance signal Y when the y-side is selected.

The switch SW3 is a switch for switching between a contrast component signal generated from a value of a B pixel and a contrast component signal generated from the luminance signal Y. The switch SW3 selects the contrast component signal generated from the value of the B pixel when the c-side is selected, and selects the contrast component signal generated from the luminance signal Y when the y-side is selected.

When the y-side is selected in all the switches SW1, SW2, and SW3, a contrast emphasis signal is generated from the luminance signal Y of an image. When the c-side is selected in all the switches SW1, SW2, and SW3, the contrast emphasis signal is generated from a value of each of the RGB of the image. Depending on whether the contrast emphasis signal is generated from the luminance signal Y of the image or generated from a value of each of the RGB of the image, the user can appropriately select a method by which the contrast of SDR video is further emphasized.

Figure 26:
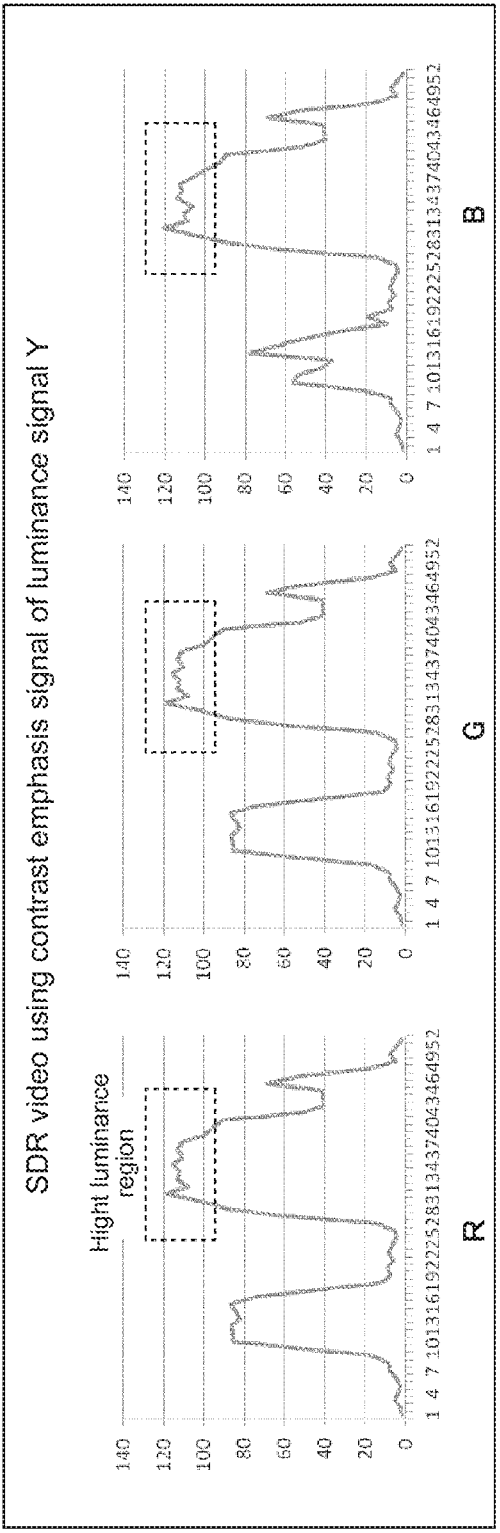
FIG. 26 is a diagram showing a value of a certain pixel for each of RGB in SDR video in which contrast is emphasized using the contrast emphasis signal of a luminance signal Y and SDR video in which contrast is emphasized using a contrast emphasis signal generated from a value of each of the RGB of an image.
Figure 26:
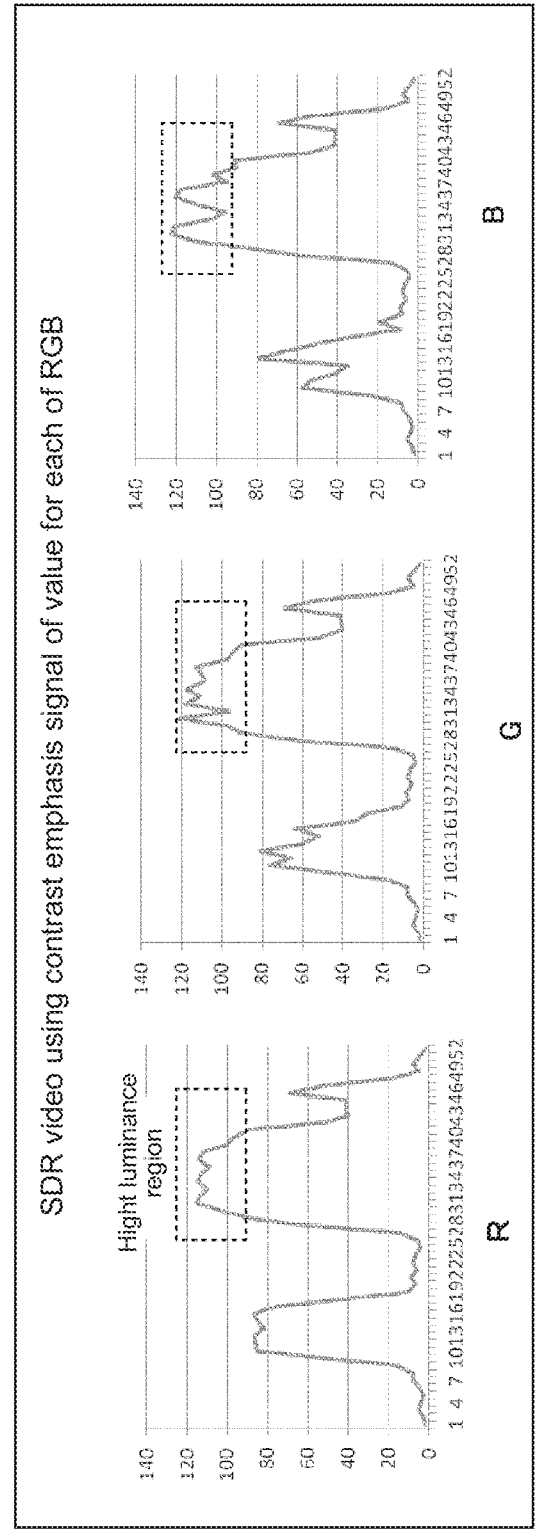

FIG. 26 is a diagram showing a value of a certain pixel for each of RGB in SDR video in which contrast is emphasized using the contrast emphasis signal of the luminance signal Y and SDR video in which contrast is emphasized using a contrast emphasis signal generated from a value of each of the RGB of an image. A horizontal axis represents a time axis, and a vertical axis represents luminance. The reproducibility of the gradation of the signal of a high luminance region in the SDR video obtained by the contrast emphasis signal of the luminance information Y is good. However, a difference in the signal level of the high luminance region of each of the RGB becomes small, and hue information is likely to be partially lost. On the other hand, in the SDR video generated using the contrast emphasis signal of a value of each of the RGB of the image, a difference in the signal level of the high luminance region of the RGB is reproduced in addition to gradation existing in an original signal, whereby hue information is also stored.

[Generation Method 4 for Contrast Emphasis Signal]

Figure 27:
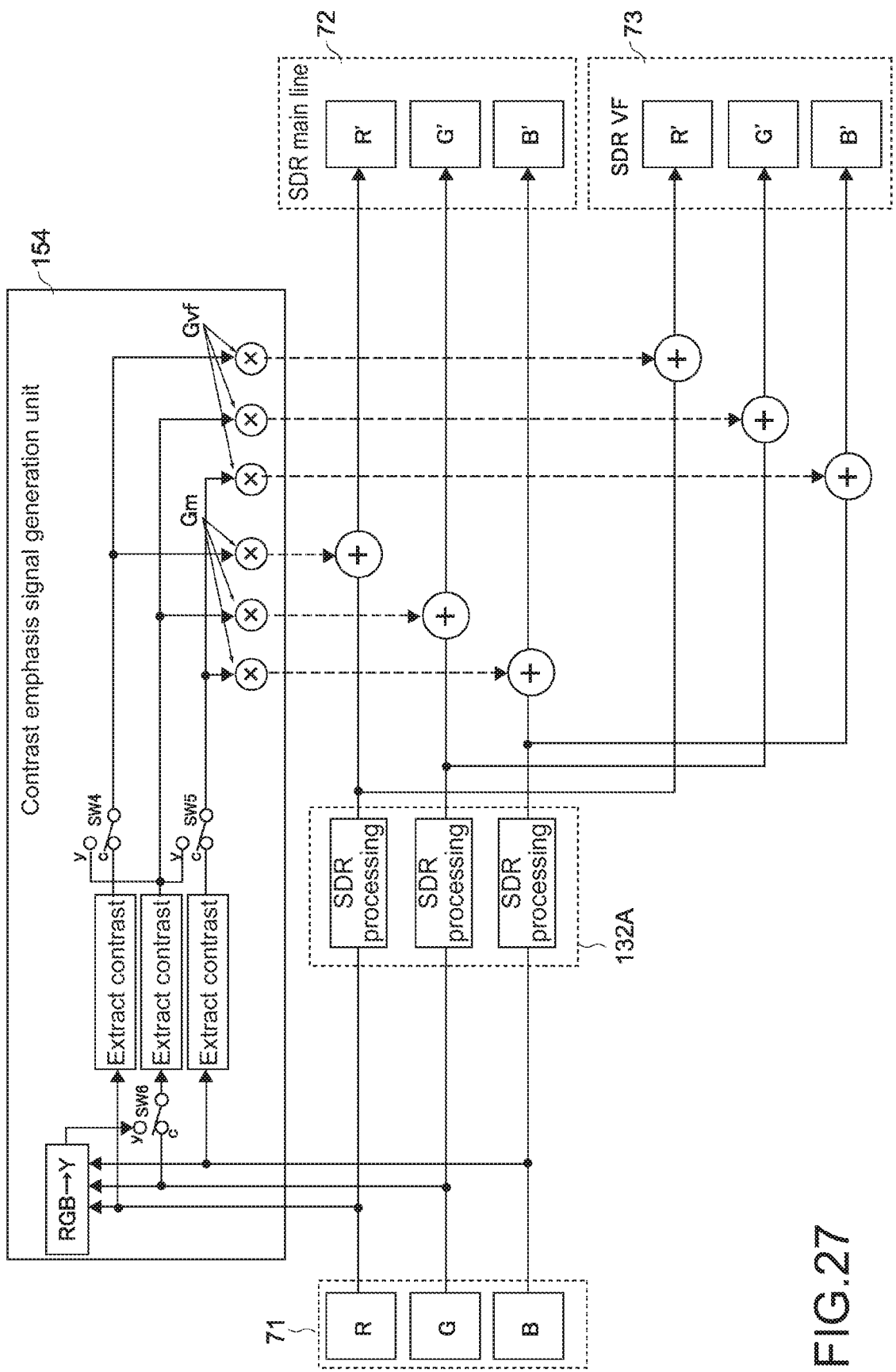
FIG. 27 is a diagram for describing a generation method 4 for a contrast emphasis signal.

FIG. 27 is a diagram showing a modified example of a case in which a method for generating a contrast emphasis signal from a luminance signal Y of an image and a method for generating a contrast emphasis signal from a value of each of RGB of an image are made switchable to each other.

A contrast emphasis signal generation unit 154 simultaneously switches SW4, SW5, and SW6 between a y-side and a c-side according to, for example, a selecting instruction provided from the user.

The switch SW4 is a switch for switching between a contrast component signal generated from a value of an R pixel and a contrast component signal generated from the luminance signal. The switch SW4 selects the contrast component signal generated from the value of the R pixel when the c-side is selected, and selects the contrast component signal generated from the luminance signal when the y-side is selected.

The switch SW5 is a switch between a contrast component signal generated from a value of a B pixel and the contrast component signal generated from the luminance signal. The switch SW5 selects the contrast component signal generated from the value of the B pixel when the c-side is selected, and selects the contrast component signal generated from the luminance signal when the y-side is selected.

The switch SW6 is a switch for switching information for generating the contrast component signal between the value of the B pixel and the luminance signal. The value of the G pixel is selected when the c-side is selected, and the luminance signal is selected when the y-side is selected.

When the y-side is selected in the switches SW4, SW5, and SW6, a contrast emphasis signal is generated from the luminance signal Y of an image. When the c-side is selected in the switches SW4, SW5, and SW6, a contrast emphasis signal of each of RGB generated from a value of each of the RGB of the image is obtained. Accordingly, in this method as well, the user can appropriately select a method by which the contrast of SDR video is more emphasized from among a method in which a contrast emphasis signal is generated from the luminance signal Y of an image and a method in which the contrast emphasis signal is generated from a value of each of RGB of the image.

Applied Example 1

The technology according to the present disclosure can be applied to various products. For example, the technology according to the present disclosure may be applied to an operating room system.

Figure 28:
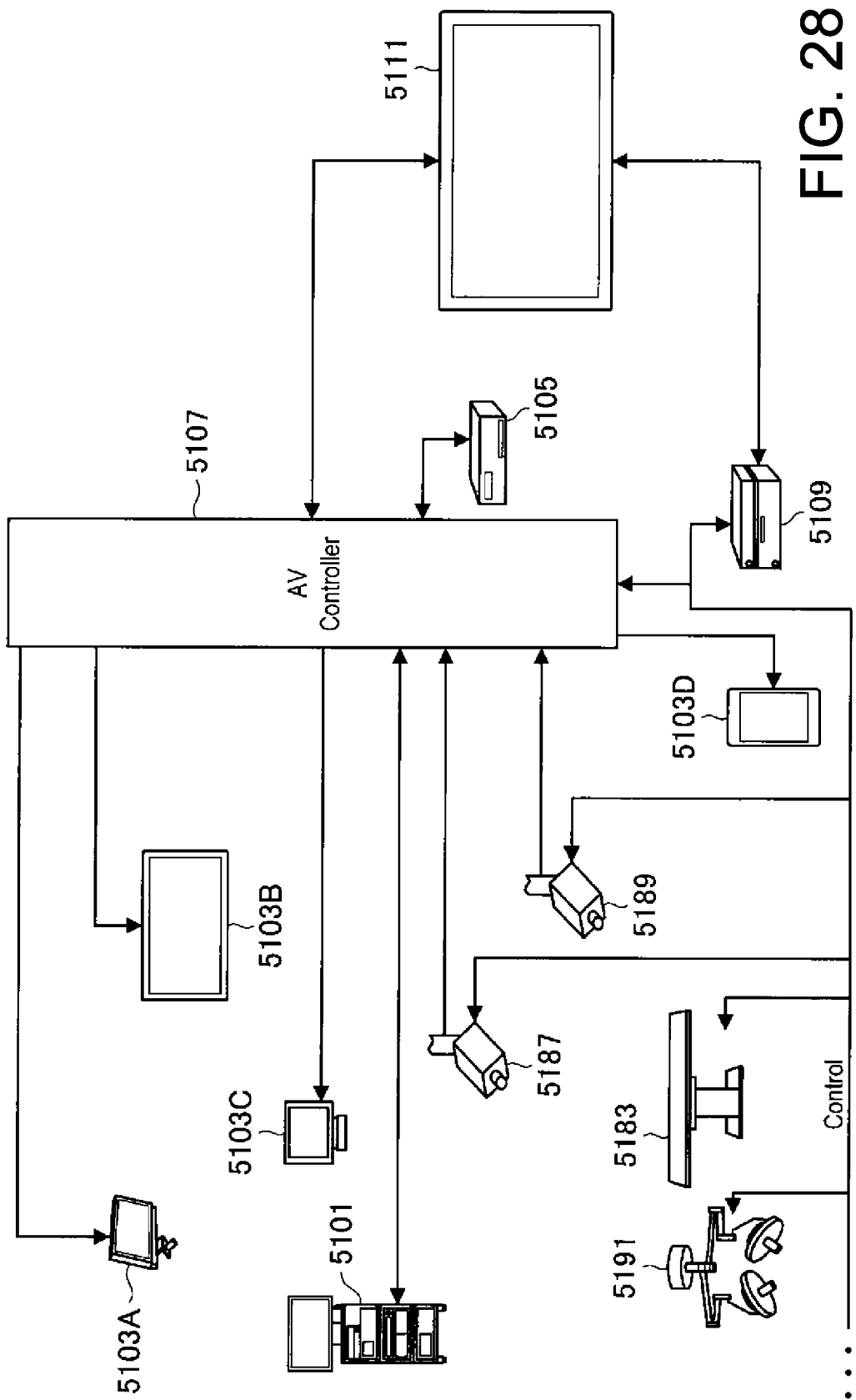
FIG. 28 is a view schematically depicting a general configuration of an operating room system.

FIG. 28 is a view schematically depicting a general configuration of an operating room system 5100 to which the technology according to an embodiment of the present disclosure can be applied. Referring to FIG. 28, the operating room system 5100 is configured such that a group of apparatus installed in an operating room are connected for cooperation with each other through an audiovisual (AV) controller 5107 and an operating room controlling apparatus 5109.

In the operating room, various apparatus may be installed. In FIG. 28, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of an operating room and images the hands of a surgeon. The surgery field camera 5189 is provided on the ceiling of the operating room and images a state of the entire operating room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the operating room separately from the endoscopic surgery system 5113. The apparatus which do not belong to the endoscopic surgery system 5113 are referred to also as non-medical equipment. The audiovisual controller 5107 and/or the operating room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the operating room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body cavity of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire operating room may be transmitted as display information. It is to be noted that, if a different apparatus having an image pickup function exists in the operating room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the operating room; the display apparatus 5103B is a display apparatus installed on a wall face of the operating room; the display apparatus 5103C is a display apparatus installed on a desk in the operating room; and the display apparatus 5103D is a mobile apparatus (for example, a tablet personal computer (PC)) having a display function.

Further, though not depicted in FIG. 28, the operating room system 5100 may include an apparatus outside the operating room. The apparatus outside the operating room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The operating room controlling apparatus 5109 integrally controls processes other than processes relating to image display on the non-medical equipment. For example, the operating room controlling apparatus 5109 controls driving of the patient bed 5183, the ceiling camera 5187, the surgery field camera 5189 and the illumination 5191.

In the operating room system 5100, a centralized operation panel 5111 is provided such that it is possible to issue an instruction regarding image display to the audiovisual controller 5107 or issue an instruction regarding operation of the non-medical equipment to the operating room controlling apparatus 5109 through the centralized operation panel 5111. The centralized operation panel 5111 is configured by providing a touch panel on a display face of a display apparatus.

Figure 29:
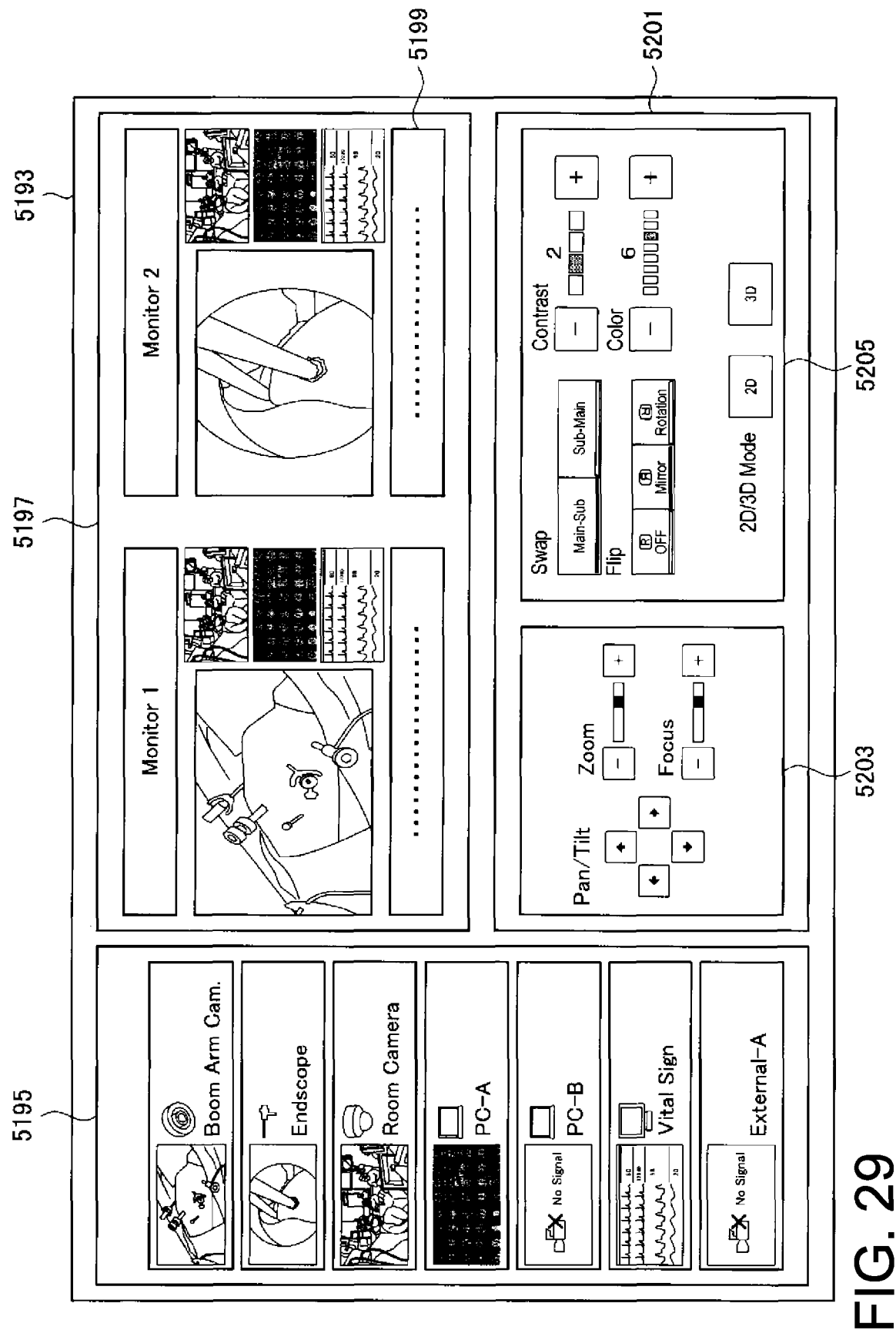
FIG. 29 is a view depicting an example of display of an operation screen image of a centralized operation panel.

FIG. 29 is a view depicting an example of display of an operation screen image on the centralized operation panel 5111. In FIG. 29, as an example, an operation screen image is depicted which corresponds to a case in which two display apparatus are provided as apparatus of an output destination in the operating room system 5100. Referring to FIG. 29, the operation screen image 5193 includes a sending source selection region 5195, a preview region 5197 and a control region 5201.

In the sending source selection region 5195, the sending source apparatus provided in the operating room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the operating room controlling apparatus 5109 provided in the operating room system 5100 through the centralized operation panel 5111.

Figure 30:
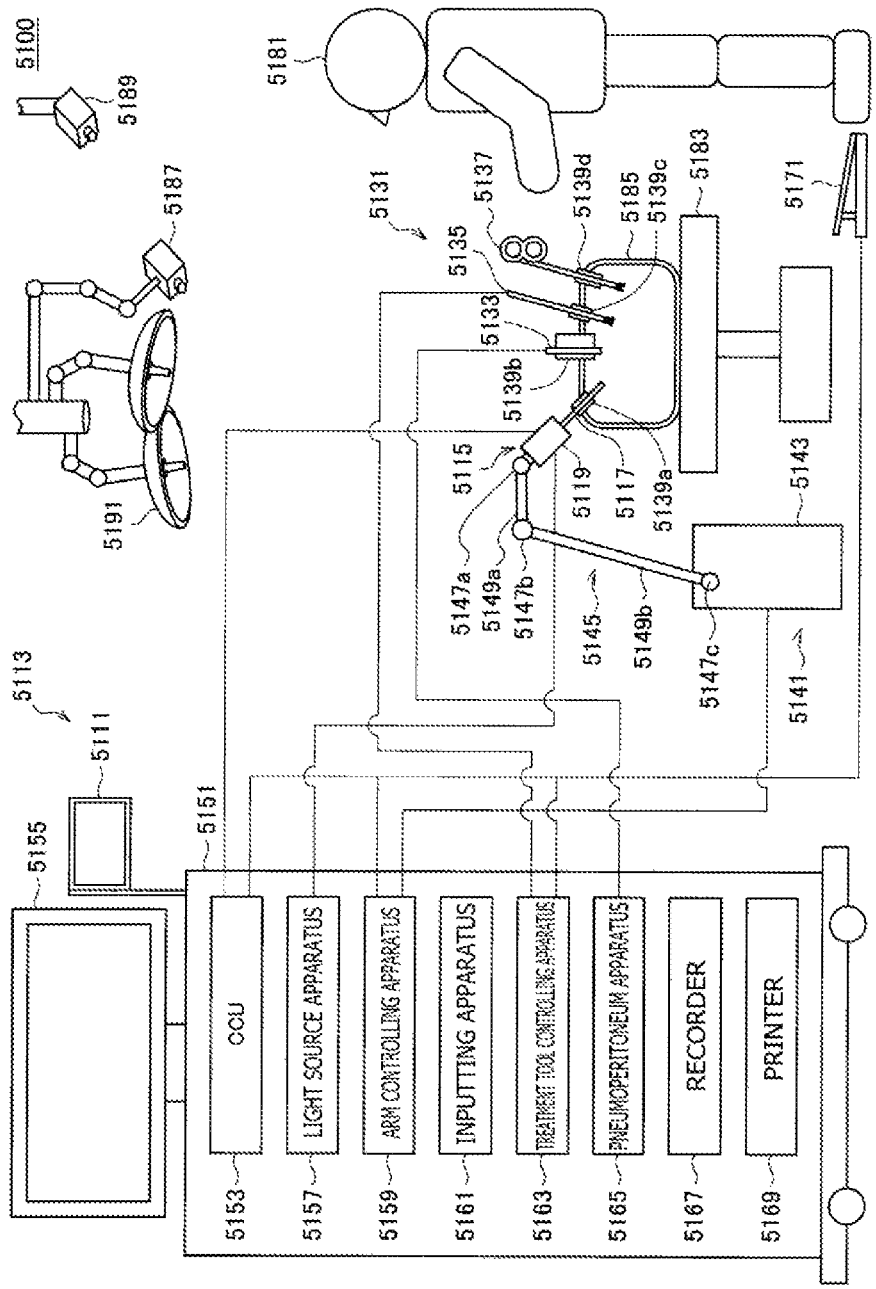
FIG. 30 is a view illustrating an example of a state of surgery to which the operating room system is applied.

FIG. 30 is a view illustrating an example of a state of surgery to which the operating room system described above is applied. The ceiling camera 5187 and the surgery field camera 5189 are provided on the ceiling of the operating room such that it can image the hands of a surgeon (medical doctor) 5181 who performs treatment for an affected area of a patient 5185 on the patient bed 5183 and the entire operating room. The ceiling camera 5187 and the surgery field camera 5189 may include a magnification adjustment function, a focal distance adjustment function, an imaging direction adjustment function and so forth. The illumination 5191 is provided on the ceiling of the operating room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the operating room controlling apparatus 5109 (not depicted in FIG. 30) as depicted in FIG. 28. The centralized operation panel 5111 is provided in the operating room, and the user can suitably operate the apparatus existing in the operating room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body cavity of the patient 5185 through the trocars 5139a to 5139d. In the example depicted, as the other surgical tools 5131, a pneumoperitoneum tube 5133, an energy device 5135 and forceps 5137 are inserted into body cavity of the patient 5185. Further, the energy device 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, tweezers or a retractor may be used.

An image of a surgical region in a body cavity of the patient 5185 picked up by the endoscope 5115 is displayed on a display apparatus 5155. The surgeon 5181 would use the energy device 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy device 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body cavity of the patient 5185, and a camera head 5119 connected to a proximal end of the lens barrel 5117. In the example depicted, the endoscope 5115 is depicted as a rigid endoscope having the lens barrel 5117 of the hard type. However, the endoscope 5115 may otherwise be configured as a flexible endoscope having the lens barrel 5117 of the flexible type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body cavity of the patient 5185 through the objective lens. It is to be noted that the endoscope 5115 may be a forward-viewing endoscope or may be an oblique-viewing endoscope or a side-viewing endoscope.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 28 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy device 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy device 5135 for cautery or incision of a tissue, sealing of a blood vessel or the like. A pneumoperitoneum apparatus 5165 feeds gas into a body cavity of the patient 5185 through the pneumoperitoneum tube 5133 to inflate the body cavity in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus) The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 30, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body cavity of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the operating room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower wavelength band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 31:
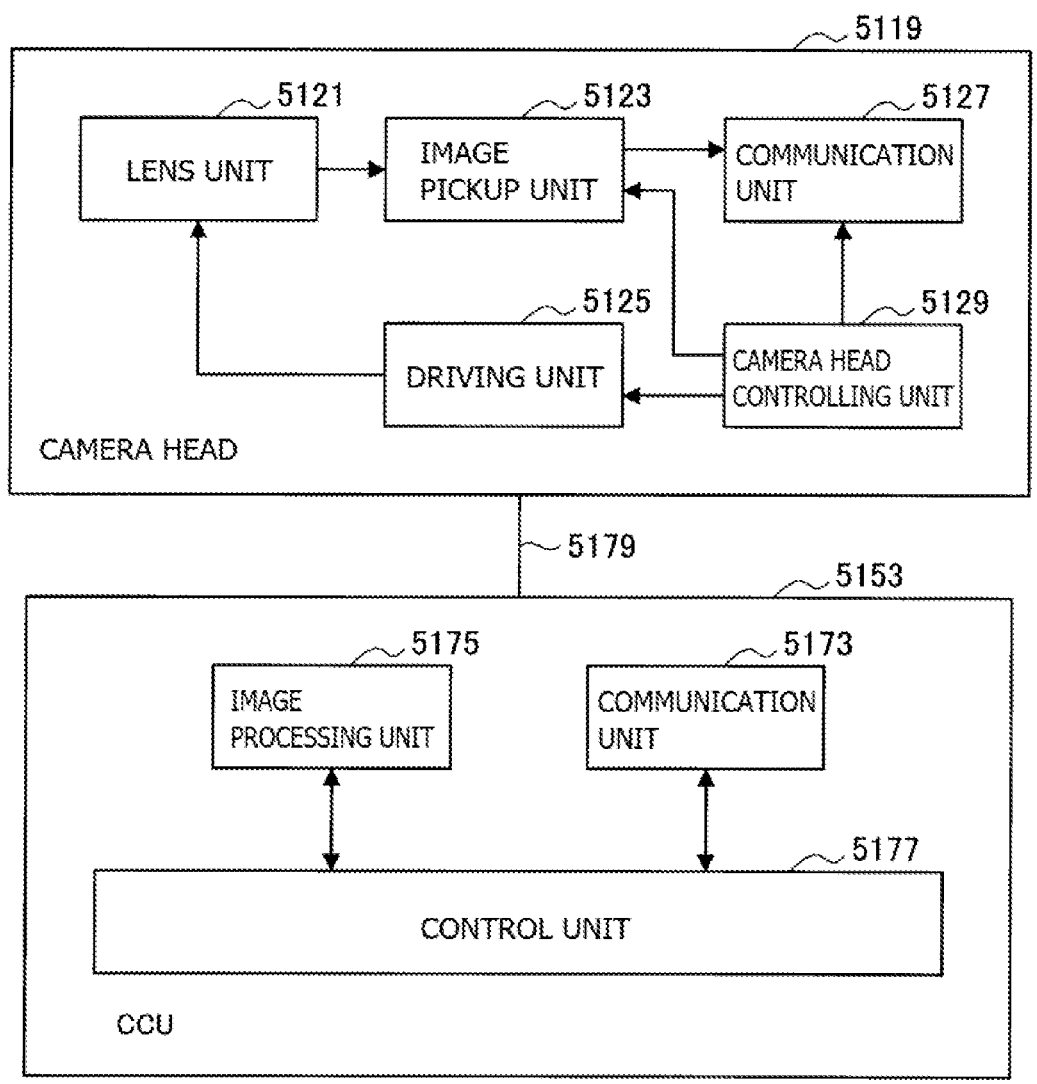
FIG. 31 is a block diagram depicting an example of a functional configuration of a camera head and a camera control unit (CCU) depicted in FIG. 30.

Functions of the camera head 5119 of the endoscope 5115 and the CCU 5153 are described in more detail with reference to FIG. 31. FIG. 31 is a block diagram depicting an example of a functional configuration of the camera head 5119 and the CCU 5153 depicted in FIG. 30.

Referring to FIG. 31, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy device 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the operating room. Therefore, such a situation that movement of medical staff in the operating room is disturbed by the transmission cable 5179 can be eliminated.

An example of the operating room system 5100 to which the technology according to an embodiment of the present disclosure can be applied has been described above. It is to be noted here that, although a case in which the medical system to which the operating room system 5100 is applied is the endoscopic surgery system 5113 has been described as an example, the configuration of the operating room system 5100 is not limited to that of the example described above. For example, the operating room system 5100 may be applied to a soft endoscopic system for inspection or a microscopic surgery system in place of the endoscopic surgery system 5113.

The technology according to the present disclosure can be applied to a system in which an image of an operated part inside the body of a patient and an image of the operation place captured by, for example, the ceiling camera 5187, the operating place camera 5189, or the like are processed by the image processing unit 5175 inside the CCU 5153 among the configurations described above and then displayed on the display apparatuses 5103A to 5103D, or the like. That is, by the application of the first video signal processing unit and the second video signal processing unit in the technology according to the present disclosure to the image processing unit 5175 inside the CCU 5153, an image of an operated part and an image of the operation place in which contrast is emphasized are obtained, an improvement in observation accuracy can be attained, and an improvement in operating efficiency and operating accuracy can be attained.

Applied Example 2

The technology (present technology) according to the present disclosure can be applied to various products. For example, the technology according to the present disclosure may be realized as a device mounted in any type of mobile body such as an automobile, an electric automobile, a hybrid electric automobile, a motor cycle, a bicycle, a personal mobility, an airplane, a drone, a ship, and a robot.

Figure 32:
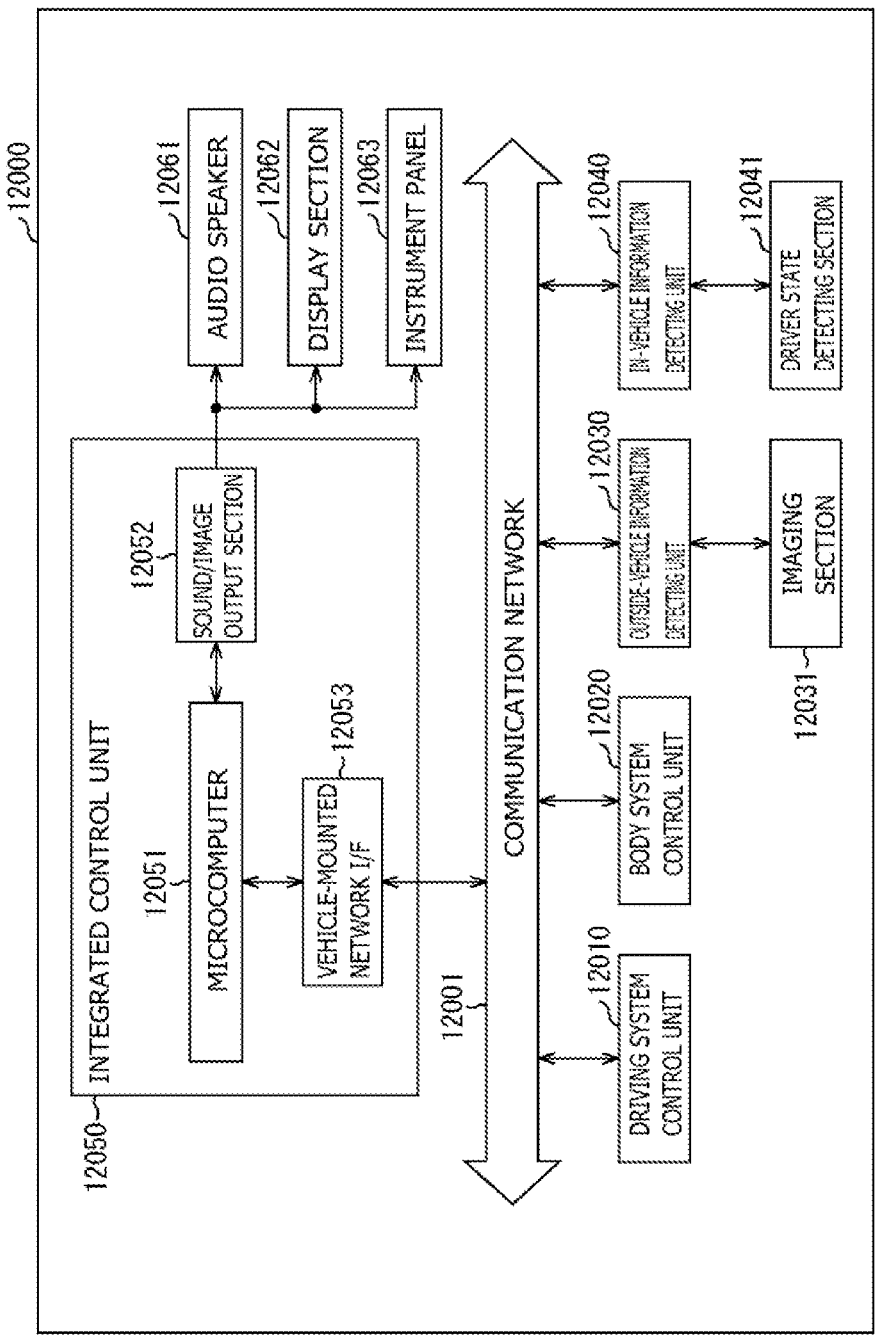
FIG. 32 is a block diagram depicting an example of schematic configuration of a vehicle control system.

FIG. 32 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 32, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 32, an audio speaker 12061, a display section 12062, and an instrument panel 12063 are illustrated as the output device. The display section 12062 may, for example, include at least one of an on-board display and a head-up display.

Figure 33:
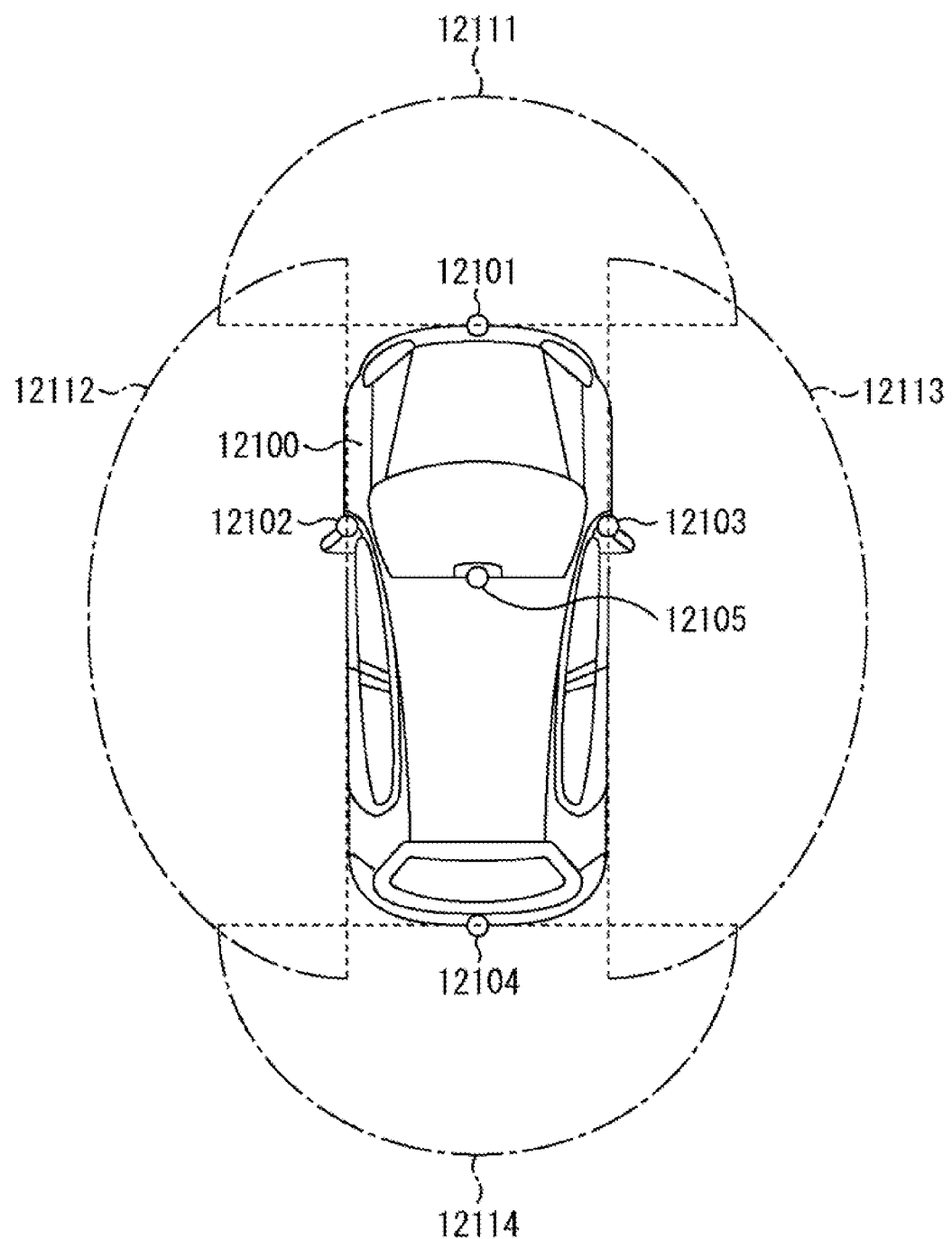
FIG. 33 is a diagram of assistance in explaining an example of installation positions of an outside-vehicle information detecting section and an imaging section.

FIG. 33 is a diagram depicting an example of the installation position of the imaging section 12031.

In FIG. 33, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 33 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The technology according to the present disclosure can be applied to a system in which images captured by the imaging sections 12101, 12102, 12103, 12104, and 12105 among the configurations of the vehicle control system described above are processed by the microcomputer 12051 and displayed on the display section 12062 or the like, or the like. That is, the application of the first video signal processing unit and the second video signal processing unit in the technology according to the present disclosure to the image processing of the microcomputer 12051 allows the display of an image outside or inside of a vehicle in which contrast is emphasized on the display section 12062, an improvement in observation accuracy, and an improvement in the safety of vehicle driving.

Note that the present technology can also employ the following configurations.

(1) An imaging device including:

a first video signal processing unit that generates a first video signal of a first dynamic range from a pixel signal obtained by an imaging unit; and a second video signal processing unit that generates an information signal of a luminance change component in a prescribed luminance region from the first video signal, generates a luminance reduction video signal of a second dynamic range narrower than the first dynamic range from the first video signal, and generates a second video signal on the basis of the luminance reduction video signal and the information signal of the luminance change component.

(2) The imaging device according to (1), in which the luminance region is a region of a high luminance portion exceeding a prescribed threshold.

(3) The imaging device according to (1) or (2), further including:

a first output unit that outputs the second video signal to a display unit.

(4) The imaging device according to any of (1) to (3), further including:

a second output unit that outputs the first video signal to an outside device.

(5) The imaging device according to any of (1) to (4), further including:

a view finder that outputs the second video signal.

(6) The imaging device according to any of (1) to (5), in which the second video signal processing unit is configured to perform knee correction on the first video signal to generate the luminance reduction video signal.

(7) The imaging device according to any of (1) to (6), in which the second video signal processing unit is configured to extract the high-pass luminance change component from the first video signal using a high-pass filter.

(8) The imaging device according to any of (1) to (7), in which the second video signal processing unit is configured to multiply the extracted high-pass luminance change component by a prescribed gain to generate the information signal of the luminance change component.

(9) The imaging device according to any of (1) to (8), in which the first video signal is a color video signal, and the second video signal processing unit is configured to generate a plurality of the luminance signals from the color video signal according to a plurality of calculation formulas and select the luminance signal having the largest absolute value to generate the high-pass luminance change component.

(10) The imaging device according to any of (1) to (9), in which the second video signal processing unit is configured to multiply a value of the high-pass luminance change component by a different gain depending on whether the value of the high-pass luminance change component is positive or negative, and configured to make a second gain used when the value of the high-pass luminance change component is positive smaller than a first gain used when the value of the high-pass luminance change component is negative.

(11) The imaging device according to any of (1) to (10), further including:

an operation input unit having a plurality of operation element groups including a first operation element that receives first setting information on the gain from a user and a second operation element that receives second setting information on the calculation formulas from the user; and a control unit that detects states of the first operation element and the second operation element during shooting and reflects at least one of the first setting information and the second setting information on an action of the second video signal processing unit in real time.

(12) The imaging device according to (11), in which the setting information is information on the gain or information on the calculation formulas.

(13) The imaging device according to (11) or (12), further including:

a user interface that allows allocation of a type of the setting information to be set with respect to the at least one or more operation elements.

(14) The imaging device according to any of (1) to (13), in which the first video signal processing unit is a correction circuit that performs preprocessing including correction of the pixel signal obtained by the imaging unit to output the first video signal.

(15) The imaging device according to any of (1) to (14), in which the second video signal processing unit generates the information signal of the luminance change component in the prescribed luminance region from a luminance signal of the first video signal, generates the luminance reduction video signal of the second dynamic range narrower than the first dynamic range from the first video signal, and generates the second video signal on the basis of the luminance reduction video signal and the information signal of the luminance change component.

(16) The imaging device according to any of (1) to (14), in which the second video signal processing unit generates the information signal of the luminance change component in the prescribed luminance region for each color component of the first video signal and generates the second video signal on the basis of the information signal for each color component and the luminance reduction video signal for each color component of the second dynamic range.

(17) The imaging device according to any of (1) to (14), in which the second video signal processing unit is configured to be switchable between a mode in which the second video signal processing unit generates the information signal of the luminance change component in the prescribed luminance region from a luminance signal of the first video signal, generates the luminance reduction video signal of the second dynamic range narrower than the first dynamic range from the first video signal, and generates the second video signal on the basis of the luminance reduction video signal and the information signal of the luminance change component and a mode in which the second video signal processing unit generates the information signal of the luminance change component in the prescribed luminance region for each color component of the first video signal and generates the second video signal on the basis of the information signal for each color component and the luminance reduction video signal for each color component of the second dynamic range.

(18) A video signal processing device including:

a first video signal processing unit that generates a first video signal of a first dynamic range from a pixel signal obtained by an imaging unit; and a second video signal processing unit that generates an information signal of a luminance change component in a prescribed luminance region from the first video signal, generates a luminance reduction video signal of a second dynamic range narrower than the first dynamic range from the first video signal, and generates a second video signal on the basis of the luminance reduction video signal and the information signal of the luminance change component.

(19) The video signal processing device according to (18), in which the luminance region is a region of a high luminance portion exceeding a prescribed threshold.

(20) The video signal processing device according to (18) or (19), further including:

a first output unit that outputs the second video signal to a display unit.

(21) The video signal processing device according to any of (18) to (20), further including:

a second output unit that outputs the first video signal to an outside device.

(22) The video signal processing device according to any of (18) to (21), further including:

a view finder that outputs the second video signal.

(23) The video signal processing device according to any of (18) to (22), in which the second video signal processing unit is configured to perform knee correction on the first video signal to generate the luminance reduction video signal.

(24) The video signal processing device according to any of (18) to (23), in which the second video signal processing unit is configured to extract the high-pass luminance change component from the first video signal using a high-pass filter.

(25) The video signal processing device according to any of (18) to (24), in which the second video signal processing unit is configured to multiply the extracted high-pass luminance change component by a prescribed gain to generate the information signal of the luminance change component.

(26) The video signal processing device according to any of (18) to (25), in which the first video signal is a color video signal, and the second video signal processing unit is configured to generate a plurality of the luminance signals from the color video signal according to a plurality of calculation formulas and select the luminance signal having the largest absolute value to generate the high-pass luminance change component.

(27) The video signal processing device according to any of (18) to (26), in which the second video signal processing unit is configured to multiply a value of the high-pass luminance change component by a different gain depending on whether the value of the high-pass luminance change component is positive or negative, and configured to make a second gain used when the value of the high-pass luminance change component is positive smaller than a first gain used when the value of the high-pass luminance change component is negative.

(28) The video signal processing device according to any of (18) to (27), further including:

an operation input unit having a plurality of operation element groups including a first operation element that receives first setting information on the gain from a user and a second operation element that receives second setting information on the calculation formulas from the user; and a control unit that detects states of the first operation element and the second operation element during shooting and reflects at least one of the first setting information and the second setting information on an action of the second video signal processing unit in real time.

(29) The video signal processing device according to (28), in which the setting information is information on the gain or information on the calculation formulas.

(30) The video signal processing device according to (28) or (29), further including:

a user interface that allows allocation of a type of the setting information to be set with respect to the at least one or more operation elements.

(31) The video signal processing device according to any of (18) to (30), in which the first video signal processing unit is a correction circuit that performs preprocessing including correction of the pixel signal obtained by the imaging unit to output the first video signal.

(32) The video signal processing device according to any of (18) to (31), in which the second video signal processing unit generates the information signal of the luminance change component in the prescribed luminance region from a luminance signal of the first video signal, generates the luminance reduction video signal of the second dynamic range narrower than the first dynamic range from the first video signal, and generates the second video signal on the basis of the luminance reduction video signal and the information signal of the luminance change component.

(33) The video signal processing device according to any of (18) to (31), in which the second video signal processing unit generates the information signal of the luminance change component in the prescribed luminance region for each color component of the first video signal and generates the second video signal on the basis of the information signal for each color component and the luminance reduction video signal for each color component of the second dynamic range.

(34) The video signal processing device according to any of (18) to (31), in which the second video signal processing unit is configured to be switchable between a mode in which the second video signal processing unit generates the information signal of the luminance change component in the prescribed luminance region from a luminance signal of the first video signal, generates the luminance reduction video signal of the second dynamic range narrower than the first dynamic range from the first video signal, and generates the second video signal on the basis of the luminance reduction video signal and the information signal of the luminance change component and a mode in which the second video signal processing unit generates the information signal of the luminance change component in the prescribed luminance region for each color component of the first video signal and generates the second video signal on the basis of the information signal for each color component and the luminance reduction video signal for each color component of the second dynamic range.

(35) A video signal processing method including:

generating a first video signal of a first dynamic range from a pixel signal obtained by an imaging unit by a first video signal processing unit; and generating an information signal of a luminance change component in a prescribed luminance region from the first video signal, generating a luminance reduction video signal of a second dynamic range narrower than the first dynamic range from the first video signal, and generating a second video signal on the basis of the luminance reduction video signal and the information signal of the luminance change component by a second video signal processing unit.

(36) The video signal processing method according to (35), in which the luminance region is a region of a high luminance portion exceeding a prescribed threshold.

(37) The video signal processing method according to (35) or (36), in which a first output unit outputs the second video signal to a display unit.

(38) The video signal processing method according to any of (35) to (37), in which a second output unit outputs the first video signal to an outside device.

(39) The video signal processing method according to any of (35) to (38), in which a view finder is caused to output the second video signal.

(40) The video signal processing method according to any of (35) to (39), in which the second video signal processing unit performs knee correction on the first video signal to generate the luminance reduction video signal.

(41) The video signal processing method according to any of (35) to (40), in which the second video signal processing unit extracts the high-pass luminance change component from the first video signal using a high-pass filter.

(42) The video signal processing method according to any of (35) to (41), in which the second video signal processing unit multiplies the extracted high-pass luminance change component by a prescribed gain to generate the information signal of the luminance change component.

(43) The video signal processing method according to any of (35) to (42), in which the first video signal is a color video signal, and the second video signal processing unit generates a plurality of the luminance signals from the color video signal according to a plurality of calculation formulas and selects the luminance signal having the largest absolute value to generate the high-pass luminance change component.

(44) The video signal processing method according to any of (35) to (43), in which the second video signal processing unit multiplies a value of the high-pass luminance change component by a different gain depending on whether the value of the high-pass luminance change component is positive or negative, and makes a second gain used when the value of the high-pass luminance change component is positive smaller than a first gain used when the value of the high-pass luminance change component is negative.

(45) The video signal processing method according to any of (35) to (44), in which
a control unit detects states of a first operation element that receives first setting information on the gain from a user and a second operation element that receives second setting information on the calculation formulas from the user during shooting and reflects at least one of the first setting information and the second setting information on an action of the second video signal processing unit in real time.

(46) The video signal processing method according to (45), in which
the setting information is information on the gain or information on the calculation formulas.

(47) The video signal processing method according to (45) or (46), in which
allocation of a type of the setting information is set with respect to the at least one or more operation elements.

(48) The video signal processing method according to any of (35) to (47), in which
the first video signal processing unit performs preprocessing including correction of the pixel signal obtained by the imaging unit to output the first video signal.

(49) The video signal processing method according to any of (35) to (48), in which
the second video signal processing unit generates the information signal of the luminance change component in the prescribed luminance region from a luminance signal of the first video signal, generates the luminance reduction video signal of the second dynamic range narrower than the first dynamic range from the first video signal, and generates the second video signal on the basis of the luminance reduction video signal and the information signal of the luminance change component.

(50) The video signal processing method according to any of (35) to (48), in which
the second video signal processing unit generates the information signal of the luminance change component in the prescribed luminance region for each color component of the first video signal and generates the second video signal on the basis of the information signal for each color component and the luminance reduction video signal for each color component of the second dynamic range.

(51) The video signal processing method according to any of (35) to (48), in which
the second video signal processing unit is configured to be switchable between a mode in which the second video signal processing unit generates the information signal of the luminance change component in the prescribed luminance region from a luminance signal of the first video signal, generates the luminance reduction video signal of the second dynamic range narrower than the first dynamic range from the first video signal, and generates the second video signal on the basis of the luminance reduction video signal and the information signal of the luminance change component and a mode in which the second video signal processing unit generates the information signal of the luminance change component in the prescribed luminance region for each color component of the first video signal and generates the second video signal on the basis of the information signal for each color component and the luminance reduction video signal for each color component of the second dynamic range.

REFERENCE SIGNS LIST

1 video signal processing device
11 optical block
12 imaging unit
13 main line video signal processing unit
14 transmission unit
15 contrast emphasis signal generation unit
16 VF signal processing unit
17 VF
18 control unit
19 operation input unit

The invention claimed is:

1. An imaging device comprising:
first video signal processing circuitry configured to generate a first video signal of a first dynamic range from a pixel signal obtained by imaging circuitry; and
second video signal processing circuitry configured to generate (i) an information signal of a luminance change component in a prescribed luminance region from the first video signal, (ii) generate a luminance reduction video signal of a second dynamic range narrower than the first dynamic range from the first video signal, and (iii) generate a second video signal by addition of the luminance reduction video signal to the information signal of the luminance change component.

2. The imaging device according to claim 1, wherein
the prescribed luminance region is a region of a high luminance portion exceeding a prescribed threshold.

3. The imaging device according to claim 1, further comprising:
first output circuitry configured to output the second video signal to a display.

4. The imaging device according to claim 1, further comprising:
second output circuitry configured to output the first video signal to an outside device.

5. The imaging device according to claim 1, further comprising:
a view finder that outputs the second video signal.

6. The imaging device according to claim 1, wherein
the second video signal processing circuitry is further configured to perform knee correction on the first video signal to generate the luminance reduction video signal.

7. The imaging device according to claim 1, wherein
the second video signal processing circuitry is further configured to extract a high-pass luminance change component from the first video signal using a high-pass filter.

8. The imaging device according to claim 7, wherein
the second video signal processing circuitry is further configured to multiply the extracted high-pass luminance change component by a prescribed gain to generate the information signal of the luminance change component.

9. The imaging device according to claim 7, wherein
the second video signal processing circuitry is further configured to multiply a value of the extracted high-pass luminance change component by a different gain depending on whether the value of the extracted high-pass luminance change component is positive or negative, and the second video signal processing circuitry is further configured to make a second gain used when the value of the extracted high-pass luminance change component is positive and smaller than a first gain used when the value of the extracted high-pass luminance change component is negative.

10. The imaging device according to claim 1, wherein
the first video signal is a color video signal, and
the second video signal processing circuitry is further configured to generate a plurality of luminance signals from the color video signal according to a plurality of calculation formulas and select a luminance signal from the plurality of generated luminance signals having a largest absolute value to generate a high-pass luminance change component.

11. The imaging device according to claim 10, further comprising:
operation input circuitry having at least one or more operation elements that receive an operation from a user; and
control circuitry configured to (i) detect states of the at least one or more operation elements during shooting and (ii) reflect setting information based on the operation on an operation of the second video signal processing circuitry in real time.

12. The imaging device according to claim 11, wherein the setting information is information on a gain to generate the information signal or information on the plurality of calculation formulas.

13. The imaging device according to claim 11, further comprising:
a user interface that allows allocation of a type of the setting information to be set with respect to the at least one or more operation elements.

14. The imaging device according to claim 1, wherein the first video signal processing circuitry is a correction circuit that performs preprocessing including correction of the pixel signal obtained by the imaging circuitry to output the first video signal.

15. The imaging device according to claim 1, wherein the second video signal processing circuitry is further configured to generate the information signal of the luminance change component in the prescribed luminance region from a luminance signal of the first video signal.

16. The imaging device according to claim 1, wherein the second video signal processing circuitry is further configured to generate the information signal of the luminance change component in the prescribed luminance region for each color component of the first video signal and generate the second video signal on a basis of the information signal for each color component and the luminance reduction video signal for each color component of the second dynamic range.

17. The imaging device according to claim 1, wherein the second video signal processing circuitry is further configured to be switchable between (a) a mode in which the second video signal processing circuitry is configured to generate the information signal of the luminance change component in the prescribed luminance region from a luminance signal of the first video signal, generate the luminance reduction video signal of the second dynamic range narrower than the first dynamic range from the first video signal, and generate the second video signal on a basis of the luminance reduction video signal and the information signal of the luminance change component and (b) a mode in which the second video signal processing circuitry is configured to generate the information signal of the luminance change component in the prescribed luminance region for each color component of the first video signal and generate the second video signal on a basis of the information signal for each color component and the luminance reduction video signal for each color component of the second dynamic range.

18. A video signal processing device comprising:
first video signal processing circuitry configured to generate a first video signal of a first dynamic range from a pixel signal obtained by imaging circuitry; and
second video signal processing circuitry configured to (i) generate an information signal of a luminance change component in a prescribed luminance region from the first video signal, (ii) generate a luminance reduction video signal of a second dynamic range narrower than the first dynamic range from the first video signal, and (iii) generate a second video signal by addition of the luminance reduction video signal to the information signal of the luminance change component.

19. A video signal processing method comprising:
generating, by first video signal processing circuitry, a first video signal of a first dynamic range from a pixel signal obtained by imaging circuitry; and
generating, by second video signal processing circuitry, (i) an information signal of a luminance change component in a prescribed luminance region from the first video signal, (ii) a luminance reduction video signal of a second dynamic range narrower than the first dynamic range from the first video signal, and (iii) a second video signal by addition of the luminance reduction video signal to the information signal of the luminance change component.

* * * * *